US012743759B2

(12) United States Patent
Huff et al.

(10) Patent No.: US 12,743,759 B2
(45) Date of Patent: Sep. 22, 2026

(54) MULTIPLE FRAUD TYPE DETECTION SYSTEM AND METHODS

(71) Applicant: Jumio Corporation, Sunnyvale, CA (US)

(72) Inventors: Daryl Huff, Saratoga, CA (US); Lei Guang, Montreal (CA); Paras Kapoor, Montreal (CA); Hasmik Martirosyan, Ontario (CA); Alix Melchy, Montreal (CA); Artem Voronin, Montreal (CA); Stuart Wells, Sunnyvale, CA (US)

(73) Assignee: Jumio Corporation, Sunnyvale, CA (US)

( * ) Notice: Subject to any disclaimer, the term of this patent is extended or adjusted under 35 U.S.C. 154(b) by 190 days.

(21) Appl. No.: 18/401,422

(22) Filed: Dec. 30, 2023

(65) Prior Publication Data

US 2025/0217952 A1 Jul. 3, 2025

(51) Int. Cl.

*G06T 7/00* (2017.01)
*G06T 7/194* (2017.01)
*G06V 40/16* (2022.01)

(52) U.S. Cl.

CPC ............ *G06T 7/0002* (2013.01); *G06T 7/194* (2017.01); *G06V 40/172* (2022.01)

(58) Field of Classification Search

CPC ...... G06V 40/40; G06V 40/70; G06V 40/167; G06V 40/172; G06V 10/764; G06V 20/95; G06T 7/0002; G06T 7/194; G06F 21/31; G06Q 30/018; H04L 63/1416

See application file for complete search history.

(56) References Cited

U.S. PATENT DOCUMENTS

| | | | |
|---|---|---|---|
| 4,897,814 A | 1/1990 | Clark | |
| 5,425,110 A | 6/1995 | Spitz | |
| 5,544,255 A | 8/1996 | Smithies et al. | |
| 5,668,897 A | 9/1997 | Stolfo | |
| 5,748,780 A | 5/1998 | Stolfo | |
| 5,838,814 A | 11/1998 | Moore | |

(Continued)

FOREIGN PATENT DOCUMENTS

| | | |
|---|---|---|
| AU | 2018100581 A4 | 6/2018 |
| MY | 192715 A | 9/2022 |
| WO | 2022/015948 A1 | 1/2022 |

OTHER PUBLICATIONS

Di Guardo, Fabrizio. "Facemask-a Real-Time Face Morphing Tool." Medium, Level Up Coding, May 2, 2023, levelup.gitconnected.com/facemask-a-real-time-face-morphing-tool-5b343591a237. May 2, 2023.

(Continued)

*Primary Examiner* — Daniel G Mariam
(74) *Attorney, Agent, or Firm* — Patent Law Works, LLP

(57) ABSTRACT

A system and method for multiple fraud type detection includes anti-injection attack system that has a layered architectural approach that uses a includes combination of different specific models to detect the attacks in combination with image processing techniques, device signals and liveness checks to detect the variety of different types of fraud attacks or repeat fraud attacks. The anti-injection attack system applies the analysis of the tools used to create deepfake, face morph and face swap attacks to define the elements of its layered architecture that can these various types of attacks.

24 Claims, 19 Drawing Sheets

(56) References Cited

U.S. PATENT DOCUMENTS 6,363,162 B1 3/2002 Moed et al.
7,040,539 B1 5/2006 Stover
7,831,531 B1 11/2010 Baluja et al.
8,326,761 B1 12/2012 Hecht et al.
8,352,494 B1 1/2013 Badoiu
8,886,648 B1 11/2014 Procopio et al.
8,910,032 B2 12/2014 Graves et al.
9,135,517 B1 9/2015 Adams
9,836,591 B2 * 12/2017 John Archibald .... G06F 21/577
10,320,807 B2 6/2019 Khan
10,628,702 B1 4/2020 Gerstner et al.
11,144,752 B1 10/2021 Castelblanco et al.
11,416,562 B1 8/2022 Gruhl et al.
11,593,439 B1 2/2023 Avadhani et al.
11,625,954 B2 * 4/2023 Kwak .................. G06N 3/0464
382/103
11,715,102 B2 8/2023 Edwards et al.
11,900,755 B1 2/2024 Bueche, Jr.
12,197,483 B1 1/2025 Shmukler et al.
12,387,512 B1 8/2025 Sureka et al.
2002/0064305 A1 5/2002 Taylor
2003/0172066 A1 9/2003 Cooper et al.
2003/0229637 A1 12/2003 Baxter et al.
2004/0155877 A1 8/2004 Hong et al.
2006/0026156 A1 2/2006 Zuleba
2006/0041506 A1 2/2006 Mason et al.
2006/0124726 A1 6/2006 Kotovich et al.
2006/0164682 A1 7/2006 Lev
2007/0078846 A1 4/2007 Gulli et al.
2007/0086628 A1 4/2007 Fuchs et al.
2007/0116328 A1 5/2007 Sablak
2007/0150387 A1 6/2007 Seubert et al.
2007/0256010 A1 11/2007 Blackmon et al.
2008/0065630 A1 3/2008 Luo et al.
2008/0149713 A1 6/2008 Brundage
2009/0060396 A1 3/2009 Blessan et al.
2009/0152357 A1 6/2009 Lei et al.
2009/0261158 A1 10/2009 Lawson
2010/0027896 A1 2/2010 Geva et al.
2011/0057040 A1 3/2011 Jones
2011/0128360 A1 6/2011 Hatzav et al.
2013/0129159 A1 5/2013 Huijgens et al.
2014/0002872 A1 1/2014 Cook
2014/0046954 A1 2/2014 Maclean et al.
2014/0161326 A1 6/2014 Ganong et al.
2015/0100590 A1 4/2015 Robinson et al.
2015/0242592 A1 8/2015 Weiss et al.
2015/0341370 A1 11/2015 Khan
2016/0005050 A1 1/2016 Teman
2016/0098399 A1 4/2016 Casperson
2016/0210450 A1 7/2016 Su
2017/0161375 A1 6/2017 Stoica et al.
2017/0193285 A1 7/2017 Negi
2017/0277945 A1 9/2017 Budihal et al.
2017/0322932 A1 11/2017 Deschenes et al.
2017/0337449 A1 11/2017 Hamada et al.
2017/0351909 A1 12/2017 Kaehler
2018/0060874 A1 3/2018 Kelts et al.
2018/0075090 A1 3/2018 Knight et al.
2018/0186164 A1 7/2018 Wu
2018/0204113 A1 7/2018 Galron et al.
2018/0293461 A1 10/2018 Le et al.
2018/0300296 A1 10/2018 Ziraknejad et al.
2018/0373859 A1 12/2018 Ganong
2019/0035431 A1 1/2019 Attorre
2019/0205686 A1 7/2019 Mayer et al.
2019/0272549 A1 9/2019 Mossoba et al.
2019/0278986 A1 9/2019 Nepomniachtchi
2020/0184201 A1 6/2020 Kaehler
2020/0304650 A1 9/2020 Roach
2020/0342600 A1 10/2020 Sjstrand et al.
2020/0366671 A1 11/2020 Larson et al.
2021/0075788 A1 3/2021 Pasterk et al.
2021/0124919 A1 4/2021 Balakrishnan
2021/0174016 A1 6/2021 Fox et al.
2021/0248401 A1 * 8/2021 Timoshenko .......... G06V 40/40
2021/0259660 A1 8/2021 Bharat et al.
2021/0272341 A1 9/2021 Swaminathan et al.
2021/0307841 A1 10/2021 Buch et al.
2021/0320801 A1 10/2021 Wyss
2021/0326461 A1 10/2021 Paul et al.
2021/0326629 A1 10/2021 Slattery
2022/0028086 A1 1/2022 Woodard et al.
2022/0058660 A1 2/2022 Ivanov
2022/0114456 A1 4/2022 Nouri et al.
2022/0180113 A1 6/2022 Patel et al.
2022/0182430 A1 6/2022 Bennett-James et al.
2022/0385880 A1 12/2022 Nims
2023/0013380 A1 1/2023 Choi et al.
2023/0017185 A1 1/2023 Cheong et al.
2023/0083000 A1 3/2023 Fujimoto et al.
2023/0113148 A1 4/2023 Zlotnick
2023/0129350 A1 4/2023 Bryan et al.
2023/0143239 A1 5/2023 Yusuf et al.
2023/0196628 A1 6/2023 Bischoff et al.
2023/0298031 A1 9/2023 Drapeau et al.
2023/0401824 A1 12/2023 Khan et al.
2023/0421602 A1 12/2023 Boyer et al.
2024/0046686 A1 2/2024 Ye et al.
2024/0193970 A1 6/2024 Hsu et al.
2024/0202294 A1 6/2024 Yogerst et al.
2024/0205239 A1 * 6/2024 Bonev .................. G06V 40/193
2024/0411982 A1 12/2024 Malanga et al.
2025/0005950 A1 1/2025 Eren
2025/0218226 A1 7/2025 Marshalkin
2025/0225527 A1 7/2025 Jiang et al.

OTHER PUBLICATIONS

Kirillov, Alexander et al. "Segment Anything." 2023 IEEE/CVF International Conference on Computer Vision (ICCV), Oct. 1, 2023, doi:10.1109/iccv51070.2023.00371. Oct. 1, 2023.

Liu, Haotian, et al. "Visual Instruction Tuning." 37th Conference on Neural Information Processing Systems, Dec. 11, 2023, arxiv.org/pdf/2304.08485. Dec. 11, 2023.

Wang, Xin, et al. "Attribute-Aware Implicit Modality Alignment for Text Attribute Person Search." Arxiv.Org, Jun. 6, 2024. Jun. 6, 2024.

Wang, Zhe, et al. "Attribute-guided Transformer for Robust Person Re-identification." IET Computer Vision, vol. 17, No. 8, Jun. 23, 2023, pp. 977-992, doi:10.1049/cvi2.12215. Jun. 23, 2023.

"7 Best Face Morph Apps 2024 (Morph Two Faces Together)." ContentMaverickscom, Content Mavericks, 2024, contentmavericks.com/best-face-morph-app/. 2024 Web. 25 pgs. 2024.

"Levenshtein Distance." Wikipedia, Wikimedia Foundation, Dec. 23, 2023, en.wikipedia.org/wiki/Levenshtein_distance. Web. 6 pgs. 2023.

"New Method Detects Deepfake Videos with up to 99% Accuracy." News, May 3, 2022, news.ucr.edu/articles/2022/05/03/new-method-detects-deepfake-videos-99-accuracy. Web. 3 pgs. 2022.

Aslam, Asra, et al., May 15, 2019, Depth-Map Generation using Pixel Matching in Stereoscopic Pair of Images, https://arxiv.org/pdf/1902.03471.pdf, 5 pgs. 2019.

Bassil, Youssef, and Mohammad Alwani. "Context-Sensitive Spelling Correction Using Google Web 1T 5-Gram Information." Computer and Information Science (Toronto), vol. 5, No. 3, 2012, p. 37. 2012.

Bassil, Youssef, and Mohammad Alwani. "OCR Post-Processing Error Correction Algorithm Using Google Online Spelling Suggestion." ArXiv.org, 2012, pp. arXiv.org, 2012. 2012.

Benalcazar, Daniel, et al. "Synthetic ID Card Image Generation for Improving Presentation Attack Detection." IEEE Transactions on Information Forensics and Security, vol. 18, 2023, pp. 1814-1824. 2023.

Canada Passport Phot Security Features, Canada.ca, Government of Canada (Dec. 20, 2022) https://www.canada.ca/en/immigration-refugees-citizenship/services/canadian-passports/photos.html#photo, webpage 11 pgs. 2022.

Casado, Constantino Alvarez, et al. "Real-time Face Alignment: Evaluation Methods, Training Strategies and Implementation Optimization." Journal of Real-time Image Processing 18.6 (2021): 2239-2267. Web. 2021.

(56) References Cited

OTHER PUBLICATIONS deepswap.ai, "Deepswap—Best Face and Video Edit Tools Online." DeepSwap AI, www.deepswap.ai/?utm_source=bing&cp_id=441169896&msclkid=eb76125c4d531cf9797e77325a694067. Accessed Dec. 2023. Web. 11 pgs. 2023.
DevCodeF1 Editors, Using LLMS for OCR text proofreading: A guide for software developers. Dev Code F1. May 26, 2023, <https://devcodef1.com/news/1007434/llms-for-ocr-text-proofreading> Web. 3 pgs. 2023.
Edge Detection Using OpenCV, LearnOpenCV.com, (2023) https://learnopencv.com/edge-detection-using-opencv/, webpage. 10 pgs. 2023.
Elsayed, M et al. "A New Method for Full Reference Image Blur Measure." International Journal of Simulation: Systems Science and Technology V19 N1 (Feb. 1, 2018): 7.1-7.5 2018 https://doi.org/10.5013/IJSSST.a.19.01.7. 2018.
Faceshape. "Face Morphing Simulator—Morph Two Faces Together." Face Morphing Simulator—Morph Two Faces Together, www.faceshape.com/face-morph. (2022) Web. 2 pgs. 2022.
Fadilpašić, Sead. "Deepfake Fraud Attacks Are Hitting More and More Businesses." TechRadar, TechRadar Pro, Feb. 24, 2023, www.techradar.com/news/deepfake-fraud-attacks-are-hitting-more-and-more-businesses. Accessed Jan. 12, 2024. Web. 8 pgs. 2023.
GitHub, Use Llama2 to Improve the Accuracy of Tesseract OCR. GitHub. (n.d.). https://github.com/Dicklesworthstone/llama2_aided_tesseract> Web. Last updated Aug. 2, 2023. 3 pgs. 2023.
Help Net Security. "Detecting Face Morphing: A Simple Guide to Countering Complex Identity Fraud." Help Net Security, Mar. 16, 2023, www.helpnetsecurity.com/2023/03/20/facial-morphing-technology/. Web. 5 pgs. 2023.
Hu, Yifei, et al. "Misspelling Correction with Pre-Trained Contextual Language Model." ArXiv.org, 2021, pp. arXiv.org, 2021. 2021.
Kaskpersky. "What Does the Rise of Deepfakes Means for the Future of Cybersecurity?" Daily English USA Usakasperskycomblog, Jul. 16, 2023, USA.kaspersky.com/blog/secure-futures-magazine/deepfakes-2019/21932/.
Kramer, Robin S. S., et al. "Face Morphing Attacks: Investigating Detection with Humans and Computers." Cognitive Research: Principles and Implications, vol. 4, No. 1, 2019, p. 28. 2019.
Kumar, Varun. "14 Best Deepfake Apps and Tools in 2024." RankRed, Jan. 1, 2024, www.rankred.com/best-deepfake-apps-tools/. Web. 22 pgs. 2024.
Lee, Jung-Hun, et al. "Deep Learning-Based Context-Sensitive Spelling Typing Error Correction." IEEE Access, vol. 8, 2020, pp. 152565-152578. 2020.
Liu, Zhaoxiang, et al. "Facial Pose Estimation by Deep Learning from Label Distributions." (2019). Web. IEEE/CVF International Conference on Computer Vision Workshop (ICCVW), 9 pgs. 2019.
Lowphansirkul, Lalita, et al. "WangchanBERTa: Pretraining Transformer-Based Thai Language Models." ArXiv.org, 2021, pp. arXiv.org, 2021. 2021.
Luo, Yinhui et al. "A Review of Homography Estimation: Advances and Challenges." Electronics 2023 pp. 4977-4977. https://www.mdpi.com/2079-9292/12/24/4977 2023.
Lyu, Siwei, "Detecting 'deepfake' Videos in the Blink of an Eye." The Conversation, Sep. 15, 2022, theconversation.com/detecting-deepfake-videos-in-the-blink-of-an-eye-101072. Web. 4 pgs. 2022.
Mazaheri, Ghazal et al. "2022 Ieee/Cvf Winter Conference on Applications of Computer Vision (Wacv)." Detection and Localization of Facial Expression Manipulations IEEE 2022 pp. 2773-2783 2022.
Nightingale, Sophie J., et al. "Perceptual and Computational Detection of Face Morphing." Journal of Vision (Charlottesville, Va.), vol. 21, No. 3, 2021, p. 4. 2021.
Passport Photo Specifications., Government of Canada (2015) https://www.canada.ca/content/dam/ircc/migration/ircc/english/pdf/pub/pass-photo-spec-eng.pdf, 5 pgs. 2015.
picsi.ai, "Create Realistic Face Morphs" Picsi.AI, InsightFace, 2023, www.picsi.ai/. Web. 8 pgs. 2023.
Rosebrock, A. (Nov. 16, 2021). OCR passports with opencv and Tesseract. PyImageSearch. <https://pyimagesearch.com/2021/12/01/ocr-passports-with-opencv-and-tesseract/> Web. 24 pgs. 2021.
Rosebrock, Adrian, "OpenCV Fast Fourier Transform (FFT) for blur detection in images and video streams." PyImageSearch.com, Jun. 15, 2020, webpage, 21 pgs. https://pyimagesearch.com/2020/06/15/opencv-fast-fourier-transform-fft-for-blur-detection-in-images-and-video-streams/ 2020.
Rosebrock, Adrian, Blur Detection with OpenCV PyImageSearch.com, Sep. 7, 2015, https://pyimagesearch.com/2015/09/07/blur-detection-with-opencv/, webpage, 13 pgs. 2015.
Sadeghzadeh, Arezoo, et al., "Pose-invariant face recognition based on matching the occlusion free regions aligned by 3D generic model." IET Computer Vision, Aug. 2020, vol. 14, Issue 5, pp. 177-287. 2020.
Schulz, Daniel, et al., "Identify Documents Image Quality Assessment." European Association for Signal Processing, Proceedings 2022 pp. 1017-1021. 2022.
Seibold, C., et al., "Detection of Face Morphing Attacks by Deep Learning." Digital Forensics and Watermarking. IWDW (2017). Lecture Notes in Computer Science(), vol. 10431. Springer, Cham. https://doi.org/10.1007/978-3-319-64185-0_9 2017.
Shokat, Sana, et al. "Analysis and Evaluation of Braille to Text Conversion Methods." Mobile Information Systems, vol. 2020, 2020, pp. 1-14. 2020.
Shokat, Sana, et al. "Characterization of English Braille Patterns Using Automated Tools and RICA Based Feature Extraction Methods." Sensors (Basel, Switzerland), vol. 22, No. 5, 2022, p. 1836. 2022.
Tesseract—OCR, Improving the Quality of the Output Github.com, Tesseract User Manual v. 5.x, 9 pgs, updated Dec. 5, 2023. Web. 2023.
Times, Global. "Tencent Launches Large Language Model 'Hunyuan' amid Global Generative Ai Frenzy." Global Times, Sep. 7, 2023, www.globaltimes.cn/page/202309/1297761.shtml. 6 pgs. 2023.
YouTube, YouTube, "Morphing Identity: A real-time face morphing system to transforming face identity." May 15, 2021, Cybernetic Humanity Studio. https://youtu.be/ahKxwaJ3k_U?si=kp4G4wFa8IAsGNLY 2021.
Zhang, Erhu, et al. "Forgery Detection for Perforated Number in Security Document by Analysing the Perforated Holes." The Imaging Science Journal 65.1 (2017): 40-48. Web. 2017.
Zhao, Jian et al. "2018 Ieee/Cvf Conference on Computer Vision and Pattern Recognition." Towards Pose Invariant Face Recognition in the Wild IEEE 2018 pp. 2207-2216. 2018.
PCT International Search Report and Written Opinion; Application No. PCT/US24/62269 Jumio Corporation, International filing date of Dec. 30, 2024, date of mailing Mar. 7, 2025, 11 pages.
PCT International Search Report and Written Opinion; Application No. PCT/US2024/048525 Jumio Corporation, International filing date of Sep. 26, 2024, date of mailing Nov. 27, 2024, 10 pages. 2024.
PCT International Search Report and Written Opinion; Application No. PCT/US23/79821 Jumio Corporation, International filing date of Nov. 15, 2023, date of mailing Apr. 4, 2024, 10 pages.
PCT International Search Report and Written Opinion; Application No. PCT/US23/86219 Jumio Corporation, International filing date of Dec. 28, 2023, date of mailing May 23, 2024, 4 pages.
PCT International Search Report and Written Opinion; Application No. PCT/US23/79511 Jumio Corporation, International filing date of Nov. 13, 2023, date of mailing Mar. 4, 2024, 17 pages.
Huang, Jing, et al. "A multiplexed network for end-to-end, multilingual OCR." Proceedings of the IEEE/CVF conference on computer vision and pattern recognition. 2021. (Year: 2021).
Nguyen, Thi Tuyet Hai, et al. "Neural machine translation with BERT forpost-OCR error detection and correction." Proceedings of the ACM/IEEE joint conference on digital libraries in 2020. 2020. (Year: 2020).

* cited by examiner

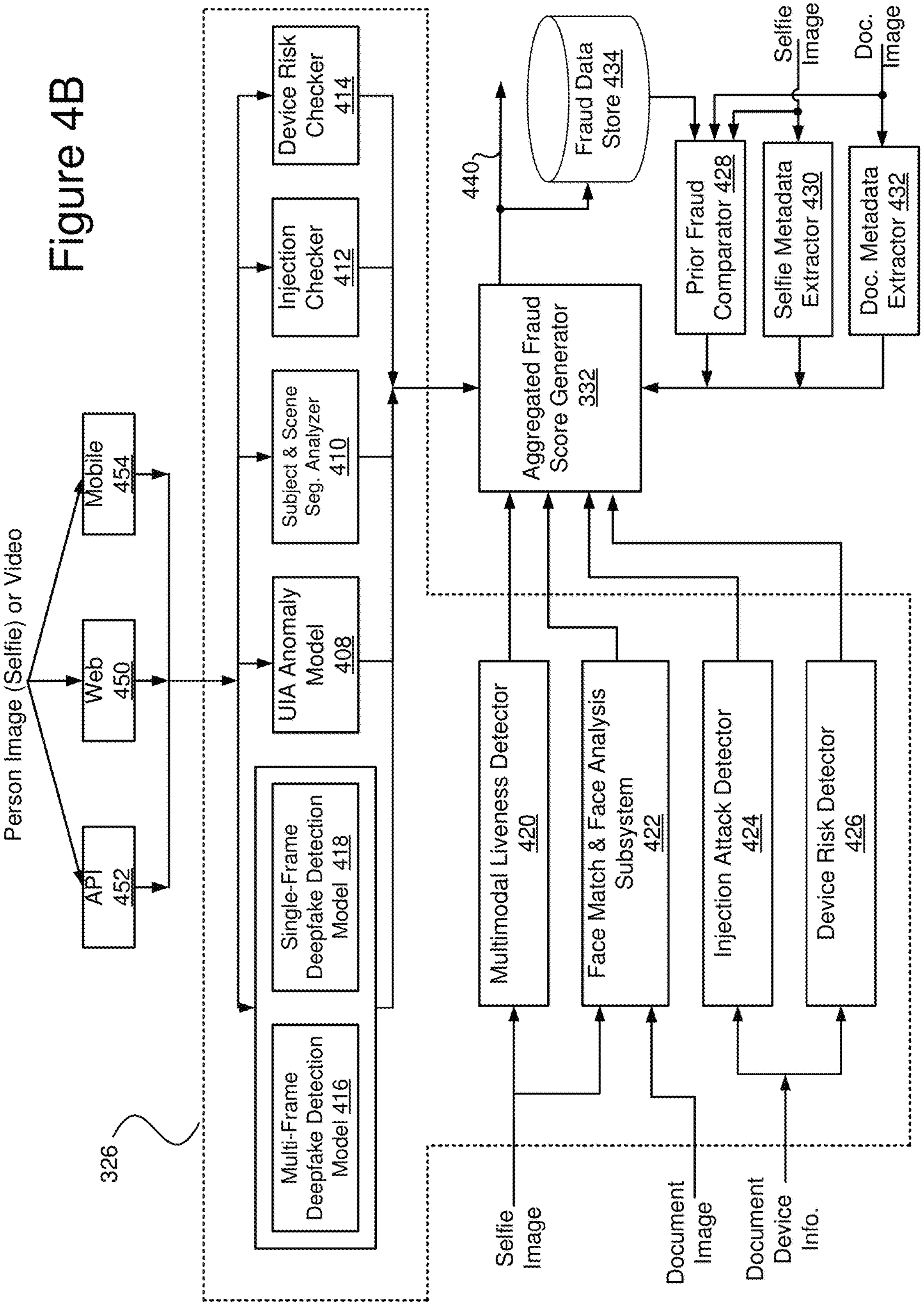

Figure 4B
Person Image (Selfie) or Video
API 452
Web 450
Mobile 454
326
Multi-Frame Deepfake Detection Model 416
Single-Frame Deepfake Detection Model 418
UIA Anomaly Model 408
Subject & Scene Seg. Analyzer 410
Injection Checker 412
Device Risk Checker 414
Selfie Image
Multimodal Liveness Detector 420
Face Match & Face Analysis Subsystem 422
Document Image
Injection Attack Detector 424
Document Device Info.
Device Risk Detector 426
Aggregated Fraud Score Generator 332
440
Fraud Data Store 434
Prior Fraud Comparator 428
Selfie Metadata Extractor 430
Selfie Image
Doc. Metadata Extractor 432
Doc. Image

MULTIPLE FRAUD TYPE DETECTION SYSTEM AND METHODS

BACKGROUND

The present disclosure relates to fraud detection and prevention. More specifically, the present disclosure relates to capturing image data representing a face and/or a document and capturing other information, and detecting fraud based on the captured information.

Facial recognition and comparison are one way of identifying a person and verifying a person's identity. For example, providing a picture ID may be required to open a financial account to reduce the risk of fraud and/or to comply with laws (e.g., anti-money laundering or sanctions). As another example, an image (e.g., a selfie or video) of the user may be provided to accompany the provided picture identification (ID) and be used for a comparison, e.g., to prove the person providing the document is in fact the document holder.

Deepfake, face morph, and face swap attacks continue to grow at a rapid rate. Some reports have indicated that 20% of successful account takeover attacks this year leveraged deepfake technology. These types of attacks have increased because there are a large number of open-source and commercial tools available to create deepfake, face morph, and face swap images. For example, there are over 50 different tools for creating deepfakes. These tools are extremely easy to use, free or low cost, and often provide excellent results that are incredibly difficult for humans to spot.

Another problem with the prior art is that discovering these injection attacks is also difficult for machine learning (ML) models to detect since there are many distinct types of ML and computer vision techniques used to create them. For the detecting models to work, they have to have been trained on examples of these attacks created by the numerous approaches available, which is extremely challenging. The challenge is in either obtaining or creating the necessary amounts of training data needed to train effective models.

SUMMARY

The techniques introduced herein overcome the deficiencies and limitations of the prior art, at least in part, with a system and method for multiple fraud type detection.

According to one aspect of the subject matter described in this disclosure, a computer-implemented method includes receiving a first image data associated with a user; performing a first detection type on the first image data to generate a first signal; performing a second detection type on the first image data to generate a second signal; generating an aggregated fraud score based upon the first signal and the second signal; and accepting the first image data as genuine based upon the aggregated fraud score.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to: receive a first image data associated with a user; perform a first detection type on the first image data to generate a first signal; perform a second detection type on the first image data to generate a second signal; generate an aggregated fraud score based upon the first signal and the second signal; and accept the first image data as genuine based upon the aggregated fraud score.

Other implementations of one or more of these aspects include corresponding systems, apparatus, and computer programs, configured to perform the actions of the methods, encoded on computer storage devices.

These and other implementations may each optionally include one or more of the following features. For instance, features may also include the first detection type or the second detection type is one from a group of: a deepfake model, a face morph model, a face swap model, an unknown injection attack anomaly model, a subject and scene segmentation analyzer, an injection checker, a device risk checker, a liveness detector, a face match and face analysis subsystem, an injection attack detector, and a device risk detector. For example, in some implementations, the first detection type is a multi-frame deepfake detection model, and the second detection type is a single frame deepfake detection model, and the method further comprises performing a third detection type on the first image data to generate a third signal, wherein the third detection type is a subject and scene segmentation analysis; and wherein the aggregated fraud score is generated based upon the first signal, the second signal, and the third signal. For instance, the method further comprises performing the third detection type on the first image data further including generating a vector embedding for the first image data; accessing a matrix of vector embeddings; searching for cosine similarities between embeddings in the matrix and the generated vector embedding; and generating the third signal based on the searching for the cosine similarities. For example, the method may also include wherein the first image data is one from a group of a selfie and a video. In general, other aspects of the subject matter of this disclosure may be implemented in methods where the first image data includes a selfie image, and the method further comprises receiving a document image; generating selfie metadata from the selfie image; and generating document metadata from the document image. For example, features may also include wherein the first image data includes a selfie image and a document image, and the method further comprises performing a third detection type using the selfie image and the document image to generate a third signal, wherein the third detection type is a face match and face analysis that compares the selfie image to a holder portion of the document image and generates the third signal based on a match between the selfie image and the holder portion of the document image. For instance, the method may also include wherein the accepting the first image data as genuine includes comparing the aggregated fraud score to a threshold, and accepting the first image data if the aggregated fraud score satisfies the threshold. Still other implementations include performing a third detection type on the first image data to generate a third signal; and wherein the first image data is rejected as genuine based upon only the third signal.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The disclosure is illustrated by way of example, and not by way of limitation in the figures of the accompanying drawings in which like reference numerals are used to refer to similar elements.

FIG. 4B is an illustration of a second example anti-injection attack system in accordance with some implementations.

DETAILED DESCRIPTION

Figure 1:
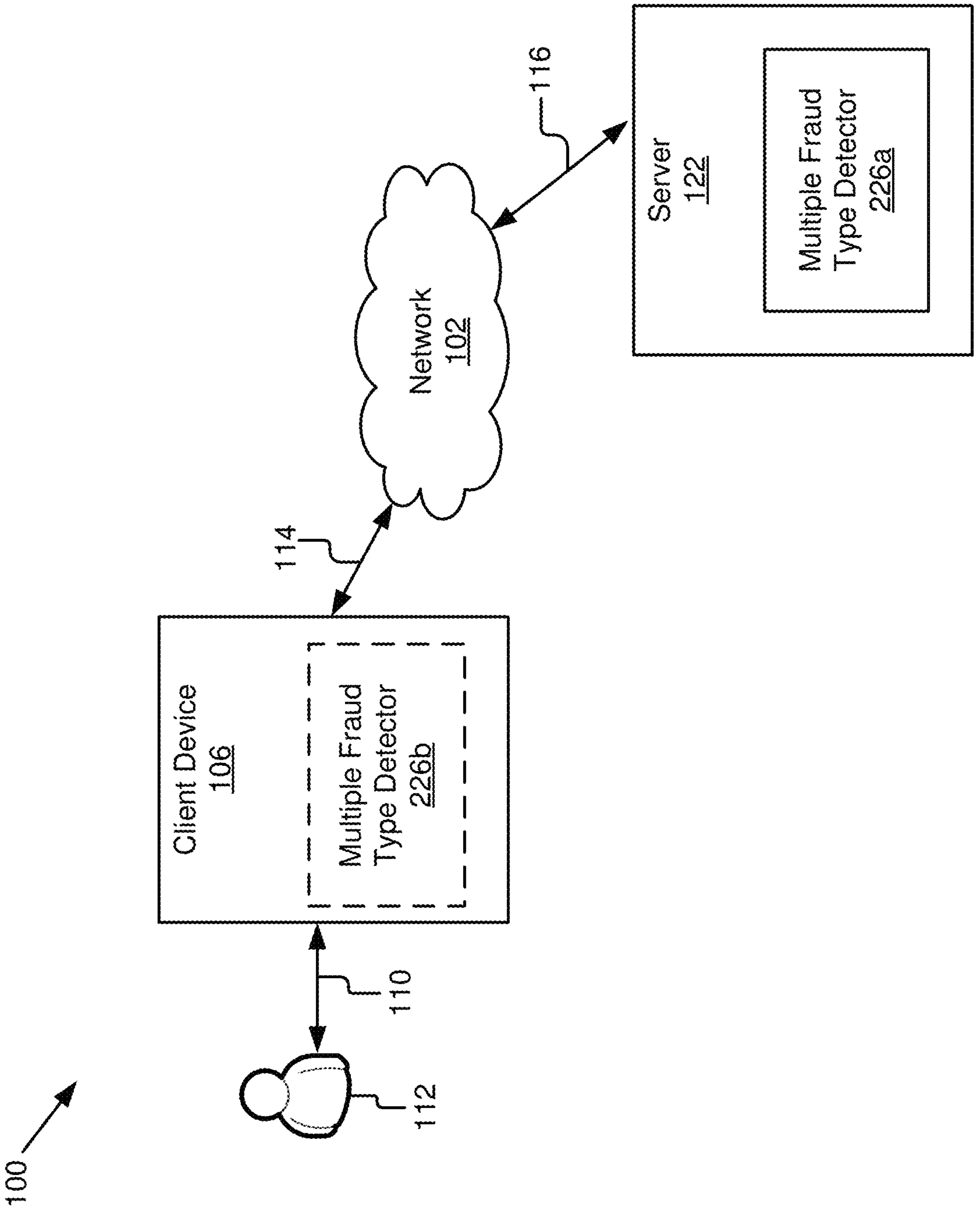
FIG. 1 is a block diagram of one example implementation of a system for multiple fraud type detection in accordance with some implementations.

The present disclosure is described in the context of a multiple fraud type detection and use cases; however, it should be recognized that the multiple types of fraud detected and may vary but the architecture of the present discloser can be applied with new modules added to detect new types of fraud. In particular, the present disclosure shows a particular anti-injection architecture that can have additional fraud types detected for operation in other environments and use cases without departing from the disclosure herein. This disclosure presents a series of methods used individually or together to detect sophisticated multiple types of fraud that is presented to the verification system either directly or injected into the system.

Facial comparison, e.g., between a physical document with an image of the valid document holder and the person physically presenting the document, is a method of determining an individual's identity. This manual task has been performed by bank tellers at a bank counter, bouncers at bars, law enforcement at traffic stops, and in countless other physical environments.

Users with nefarious intent (e.g., criminals, fraudsters, money launderers, etc.) may repeatedly attempt to trick the systems and methods used to verify documentation or identity in remote and electronic environments with much less risk of apprehension and, in some cases, little additional effort for each additional attempt. It is sometimes the case that the more times a fraudster (or other nefarious user) is able to attempt fraud, the more likely the fraudster is to eventually succeed in defeating the verification mechanisms. Therefore, detection of repeated fraudulent attempts may be used in identifying and preventing future, potentially successful, fraudulent attempts. However, criminals including fraudsters are resourceful and may not use identical instances of a document or image of a document. The terms fraudster, nefarious user, criminal are used synonymously throughout this description.

Advances in technologies have decreased the burden on nefarious users and increased the difficulty of preventing fraud in remote and electronic transactions, particularly at scale. For example, image manipulation software (e.g., Adobe's Photoshop) has allowed users to manipulate and create different versions of documents or images quickly and easily, such as fake IDs with different images or information in the various fields such as name). The fraudster May print out or electronically submit the various versions of the fraudulent (e.g., doctored) documentation and use the various versions in a series of attempts to successfully commit fraud. In addition, development kits and injectors may allow a fraudster to perform an injection attack. In an injection attack, the nefarious user injects a fake or manipulated facial image into a digital image stream, e.g., a digital image stream associated with document image (or document holder image) and/or selfie in an effort to defeat verification mechanisms, e.g., those verification mechanisms that may be present during a customer onboarding process. The injection may be performed by one or more of using a virtual camera, hacking the verification vendor's application program interface (API) or software development kit (SDK), or by switching the image payload in transit. The injected image may modify a facial image (e.g., by morphing the facial features to be more similar to those in a document holder image) or replace a facial image (e.g., a face swap in which the document holder's face overlays the nefarious user's face). Injection attacks including deepfakes may be generated using a variety of mechanisms, e.g., generative adversarial network-based ("GAN-based") synthetic faces, diffusion model-based synthetic faces, auto-encoder-based methods, etc.

A nefarious user may also electronically modify the document holder image to match a real selfie (e.g., using photoshop or injection). A nefarious user may electronically modify a real (unseen) selfie with a face swap or face morph to match a real document holder image. For example, a nefarious user used injection to face swap, or overlay, a valid document holder's face from a valid ID instance over his/her own face in a selfie that is submitted for comparison to the document holder's image.

Often a nefarious user who repeatedly attempts to commit fraud does not use completely distinct documents or images of documents across his/her multiple attempts. For example, the fraudster uses an instance of a document, then modifies, the name, the date of birth, and ID number, and so on, but there will be commonalities between the attempts. Examples of commonalities may include, but are not limited to, the document's surroundings or background; the facial image; the issuer of the ID; the size, orientation, or position of the document in the image; etc.

The multiple fraud type detector 226 described herein addresses, at least in part, one or more of the foregoing issues and/or provides, at least in part, one or more of the aforementioned benefits. The multiple fraud type detector 226, in particular its anti-injection attack system 326 has a layered architectural approach that uses and includes combination of different specific models to detect the attacks in combination with image processing techniques, device signals and liveness checks to detect the variety of different types of fraud attacks or repeat fraud attacks. The anti-injection attack system 326 applies the analysis of the tools used to create deepfake, face morph and face swap attacks to define the elements of its layered architecture that can these various types of attacks. As an example, face morph and face swap tools most frequently map the replacement face (or face used for fraud) into the area of the original face and within the edge boundaries of that face. This leaves the neck, ears, forehead, and hair of the original subject intact or only partially modified (e.g., see FIGS. 14 and 15), and therefore, a characteristic that the multiple fraud type detector 226 uses to detect these fraud variants. In particular, the anti-injection attack system 326 includes a subject & scene segment analyzer 410 for searching and detecting similarities in these portions of an image and an indicator of fraud. The multiple fraud type detector 226 is particularly advantageous because it can detect multiple different types of fraud attacks. By way of example, 4 distinct types of fraud are detected using the techniques described in with reference to FIGS. 8-11 below. The layered architecture also includes several types of solutions, also detailed below, to detect additional varieties of attacks.

FIG. 1 is a block diagram of an example system 100 for multiple fraud type detection in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc. In some implementations, image and data may be provided by the client device 106 (e.g., a mobile phone, tablet, or laptop) and be submitted via an API, the web, or the mobile device.

Although only a single client device 106 is shown in the example of FIG. 1, there may be any number of client devices 106 depending on the implementation. The system 100 depicted in FIG. 1 is provided by way of example and the system 100 and further systems contemplated by this present disclosure may include additional and/or fewer components, may combine components and/or divide one or more of the components into additional components, etc. For example, the system 100 may include any number of client devices 106, networks 102, or servers 122. The client device 106 may bet that of a user 112 and the user 112 may take, depicted by line 112, photos or images of the user 112 or documents.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system 100 and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system 100 may be integrated into a single computing device or system or divided into additional computing devices or systems, etc.

For example, as depicted, the client device 106 may optionally (as indicated by the dashed lines) include an instance of the multiple fraud type detector **226*b* and the server 122 may include an instance of the multiple fraud type detector 226*a*. However, in some implementations, the components and functionality of the multiple fraud type detector 226 may be entirely client-side (i.e., at 226*b*), entirely server side (i.e., at 226*a*), or divide among the client device 106 and server 122 (i.e., divided across 226*a* and 226*b*). For example, as described below, some implementations may use machine learning (e.g., one or more algorithms to train one or more models), and the training and validation of the model(s) may be performed server-side at 226*a* and applied, during production, client side at 226*b***.

Figure 2:
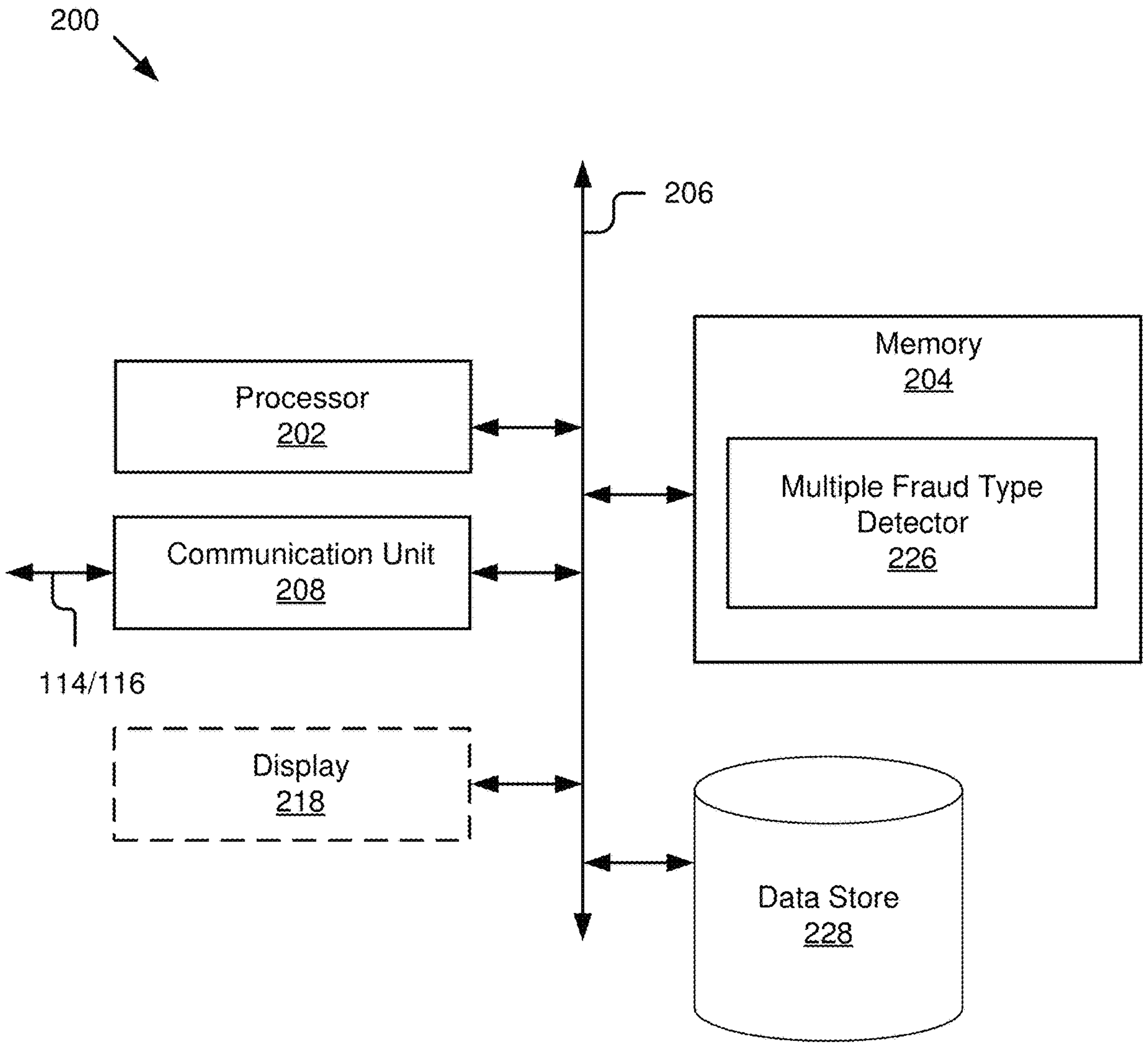
FIG. 2 is a block diagram of an example computing device including a multiple fraud type detector in accordance with some implementations.

FIG. 2 is a block diagram of an example computing device 200 including an instance of the multiple fraud type detector 226. The multiple fraud type detector 226 which may refer to either instance of the multiple fraud type detector **226*a* when the computing device 200 is a server 122, or the multiple fraud type detector 226*b* where the computing device 200 is a client device 106, or a combination of 226*a* and 226*b* where the functionality is divided between multiple fraud type detector 226*b* of the client device 106 and multiple fraud type detector 226*a* of the server 122. In the illustrated example, the computing device 200 includes a processor 202, a memory 204, a communication unit 208, a data store 228 and optionally a display 218**.

In some implementations, the computing device 200 is a client device 106, the memory 204 stores the multiple fraud type detector 226*b*, and the communication unit 208 is communicatively coupled to the network 102 via signal line 114. In some implementations, the client device 106 includes at least one sensor, e.g., a camera (not shown). In another implementation, the computing device 200 is a server 122, the memory 204 stores the multiple fraud type detector 226*a*, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing, and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device 200. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the multiple fraud type detector 226. The memory 204 is also capable of storing other instructions and data, including, for example, an operating system, hardware drivers, web browsers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. The memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 may include a liquid crystal display (LCD), light emitting diode (LED), touchscreen, or any other similarly equipped display device, screen, or monitor. The display 218 represents any device equipped to display electronic images and data as described herein. The display 218 is optional, and therefore, depicted with dashed lines in FIG. 2.

The data storage 228 is a non-transitory memory that stores data for providing the functionality described herein. In the illustrated implementation, the data storage 228 is communicatively coupled to the bus 206. The data storage 228 stores information that is used to provide functionality as described herein. For example, the data storage 228 may store an original video, images, portions of video, portions of images, known instances of fraudulent images or segmented portions of the images, clusters of the images, machine learning models, training data, and mathematical representations of images or environment information contained therein, databases of device information, network information user information, and various other information to representations related to video and images.

It should be understood that other processors, operating systems, input devices (e.g., keyboard, mouse, one or more sensors, etc.), output devices (e.g., a speaker, display, haptic motor, etc.), and physical configurations are possible and within the scope of the disclosure. Examples of sensors (not shown) include, but are not limited to, a microphone, a speaker, a camera, a thermal camera, a pointer sensor (e.g., a capacitive touchscreen or mouse), a gyroscope, an accelerometer, a galvanic sensor, thermocouple, heart rate monitor, breathing monitor, electroencephalogram (EEG), iris scanner, fingerprint reader, raster scanner, palm print reader, an inertial sensor, global positioning system (GPS) sensor, etc.

In some implementations, the multiple fraud type detector 226 provides the features and functionalities described below responsive to a request. For example, a request on behalf of an entity (not shown), such as a financial institution, to determine whether a user-provided document image (e.g., provided during a registration or customer onboarding) is legitimate or potentially fraudulent. As another example, a request may be by the user, such as to capture a document image and/or personal image, such as a selfie (e.g., as part of a registration or customer onboarding).

Multiple Fraud Type Detector 226

Figure 3:
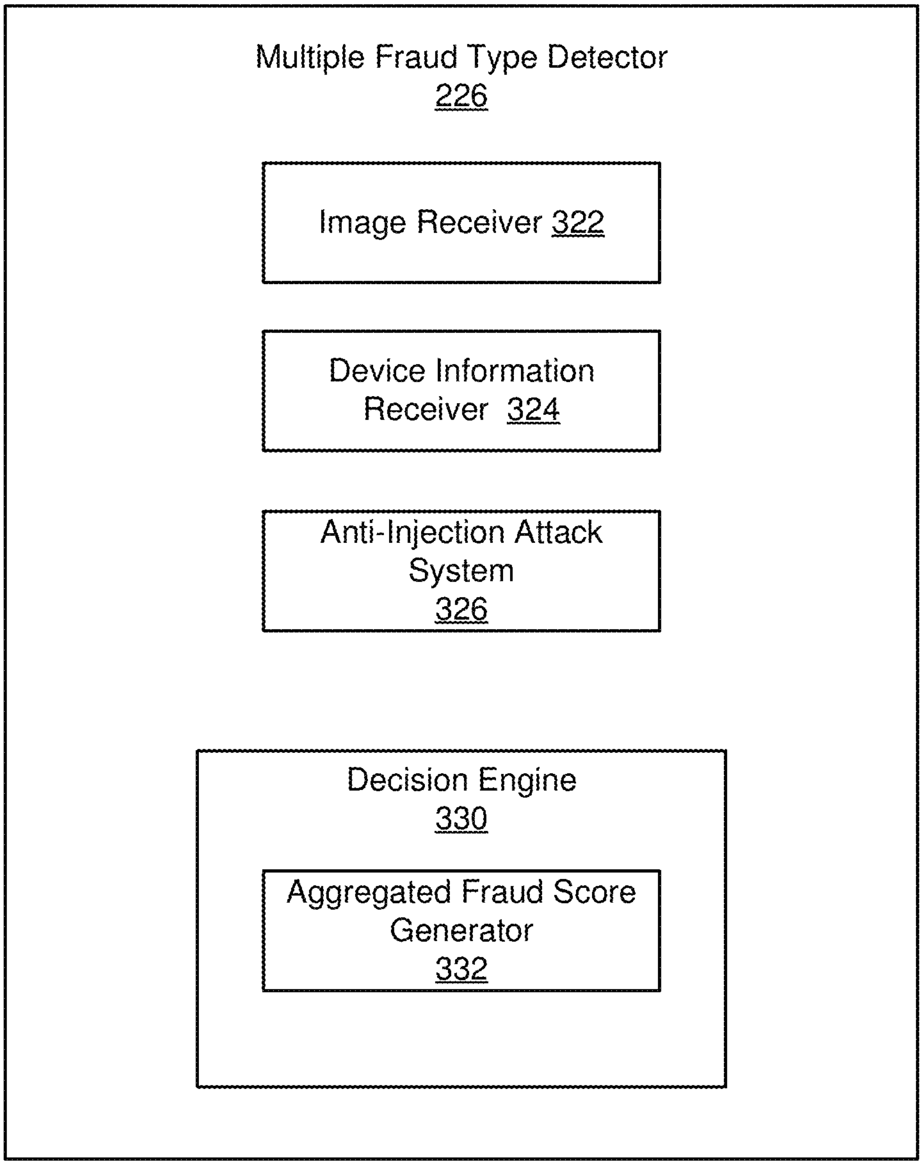
FIG. 3 is a block diagram of an example multiple fraud type detector in accordance with some implementations.

Referring now to FIG. 3, a block diagram of an example of multiple fraud type detector 226 is illustrated in accordance with one implementation. As illustrated in FIG. 3, the multiple fraud type detector 226 may include an image receiver 322, a device information receiver 324, an anti-injection attack system 326 and a decision engine 330 including an aggregated fraud score generator 332.

The image receiver 322 is communicatively coupled to receive image data. The image receiver 322 may be steps, processes, functionalities, software executable by a processor, or a device including routines to receive image data from the client device 106 or the server device 122. For example, in some implementations, the image receiver 322 receives image data captured by a camera sensor. Examples of image data may include, but are not limited to, one or more of an image and a video. In some implementations, a received image represents a document and a background, or surroundings, of that document. For example, the received image data includes an image received responsive to the user 112 being prompted to take an image of the document. In some implementations, a received image represents a person and a background, or surroundings, of that person. For example, the received image data includes an image received responsive to the user 112 being prompted to take a selfie (e.g., a single image or video clip). In some implementations, the image receiver 322 may be coupled to a client device 106 to receive image data via an API channel, a web channel, or a mobile device channel as we described below in more detail with reference to cap FIG. 4B.

The image data may be "real" or "genuine" (i.e., an un-modified and true representation of the subject matter in the image), altered (e.g., using photoshop or an injection attack), or a combination thereof (e.g., a real document holder image but a modified selfie image or vice versa). The image receiver 322 makes the received image data available to one or more components of the multiple fraud type detector 226. In some implementations, the image receiver 322 communicates the received image to, or stores the received image for retrieval by, one or more other components of the multiple fraud type detector 226. More specifically, the image receiver 322 is coupled to the anti-injection attack system 326 to provide images it receives.

The document type may vary based on the implementation and use case. In some implementations, the document type may include a type associated with identification documentation. Examples of types associated with identification documentation include, but are not limited to a passport, driver's license, government issued photo identification card, school identification, employee identification, etc. In some implementations the document type label may include an issuer of the identification document type. Examples issuers include, but are not limited to a country, state, province, municipality, jurisdiction, school, business, employer, or other entity. For example, a label associated with a US passport image may include a passport, documentation type label component, and a U.S. issuer label component.

The device information receiver 324 is a communicatively coupled to receive device data and other metadata from the client device 106, the network 102, and the server 122. The device information receiver 324 may be steps, processes, functionalities, software executable by a processor, or a device including routines to receive or retrieve device information and other metadata associated with the device that captured an input image. In some implementations, the device information receiver 324 may also receive other network or server information related to the image being processed for identity detection, identity verification or document verification. The device information receiver may retrieve or receive information related to both images and video. The device information receiver 324 is coupled to the server 122, the network 102 and the client device 106 to receive or retrieve information. The device information receiver 324 is coupled to send information to the anti-injection attack system 326 and the decision engine 330 as will be described in more detail below with reference to FIGS. 4A and 4B.

The anti-injection attack system 326 may be steps, processes, functionalities, software executable by a processor, or a device including routines to detect multiple different types of injection attacks. The anti-injection attack system 326 is coupled to receive information from the image receiver 322 and the device information receiver 324. The anti-injection attack system 326 is coupled to provide its output to the decision engine 330, in particular, the aggregated fraud score generator 332. As noted above, the anti-injection attack system 326 has a layered architectural approach that uses and includes combination of different specific models to detect the attacks in combination with image processing techniques, device signals and liveness checks to detect the variety of different types of fraud attacks or repeat fraud attacks. One particular advantage of the anti-injection attack system 326 is that it applies multiple models to the input video or image. Additionally, the architecture is scalable and adaptable to add additional models to detect new types of fraud. The functionality of the anti-injection attack system 326 and multiple implementations will be described in more detail below with reference to FIGS. 4A and 4B.

The anti-injection attack system 326 determines whether a received image (e.g., a selfie or a document image) or video is a product of an injection attack. In some implementations, the anti-injection attack system 326 applies a machine learning model to detect any subtle differences (e.g., artifacts) between genuine and fraudulent (e.g., generated using an injection attack or other digital manipulation) images. These differences are often imperceptible to the human eye. In some implementations, the anti-injection attack system 326 may be used to validate one or more injection detection ML models that the anti-injection attack system 326 applies. The anti-injection attack system 326 may also be used to identify attacks that could subsequently be used to train or re-train a model. For example, if it was determined that an attack was injected and was a deepfake that the deepfake model 402 missed (failed to detect), then that image could be added to the training set of images to improve the deepfake model 402 after retraining. An example of this training is described in more detail below with reference to the method of FIG. 12.

The decision engine 330 generates a signal indicating whether the image(s) are associated with any fraud type (e.g., injection based) attack. In some implementations, the decision engine 330 or supplemental systems (not shown) determines and/or initiates an action based on the signal generated by the decision engine 330. The decision engine 330 can be used to perform identity verification or ID verification. Examples of actions include, but are not limited to one or more of accept or reject the submission, contact authorities, escalate for investigation or for additional verification checks, etc. The decision engine 330 may be steps, processes, functionalities, software executable by a processor, or a device including routines to generates a signal indicating whether the image(s) are associated with any one of multiple fraud types and whether a particular action should be performed in response to the signal. The decision engine 330 can output this fraud signal along with other information (e.g., “reason codes” that indicate the reason for the rejection and type of fraud detected, for example, deepfake) to other systems (not shown) or to the server 122 for use by other fraud detection systems. In some implementations, the decision engine 330 uses machine learning, e.g., to determine one or more of the parameters/criteria and/or values used to make which decision(s) may be determined by training machine learning algorithm(s).

In some implementations, the decision engine 330 includes the aggregated fraud score generator 332 to generate the fraud signal. The aggregated fraud score generator 332 is coupled to receive one or more signals from the anti-injection attack system 326 as will be described in more detail below with reference to FIGS. 4A and 4B. The aggregated fraud score generator 332 may be steps, processes, functionalities, software executable by a processor, or a device including routines to generate a fraud signal. In some implementations, the fraud signal is a score between a minimum and maximum, where a score that satisfies a threshold indicates that the image provided is acceptable, and one that does not satisfy the threshold is fraudulent. The aggregated fraud score generator 332 is coupled to provide the fraud signal to other components of the decision engine 330.

For example, in some implementations, the combination of signals provided by the anti-injection attack system 326 to the aggregated fraud score generator 332 may individually be sufficient to determine the presence of fraud (e.g., in the form of an injection-based attack) and their absence may be indicative of a lack of fraud. However, in some implementations, the aggregated fraud score generator 332 may evaluate the combined outputs of the anti-injection attack system 326, to determine whether fraud (e.g., in the form of an injection-based attack) is present. In such implementations, the aggregated fraud score generator 332 may be able to more accurately predict the presence or absence of fraud based on a combination of outputs from the multiple signals from the anti-injection attack system 326. For example, in cases where the image(s) may have passed each of the individual evaluations (e.g., injection unlikely, no suspiciously similar pose, and no suspiciously similar background) but barely (e.g., the similarity scores were near the thresholds), the aggregated fraud score generator 332 may use the cumulative results/outputs to determine that an injection-based attack may be present and reject the request or subject the request to additional layers of scrutiny. As another example, assume that the aggregated fraud score generator 332 produces false positives (i.e., injection where no injection is present), the aggregated fraud score generator 332 may decide that one or more of the degree of dissimilarity of the backgrounds and/or poses overrides the injection detection and decide that no fraud is present.

It should be noted that, while the decision engine 330 is described above as basing the generation of a fraud signal on one or more outputs of the anti-injection attack system 326, the decision engine 330 may use other or additional signals not explicitly described herein to generate the fraud signal. For example, the decision engine 330 may check PII with external databases e.g., motor vehicle or other government databases (not shown) or evaluate other aspects of the input image and its source to determine fraud or validity.

Anti-Injection Attack System 326

Figure 4A:
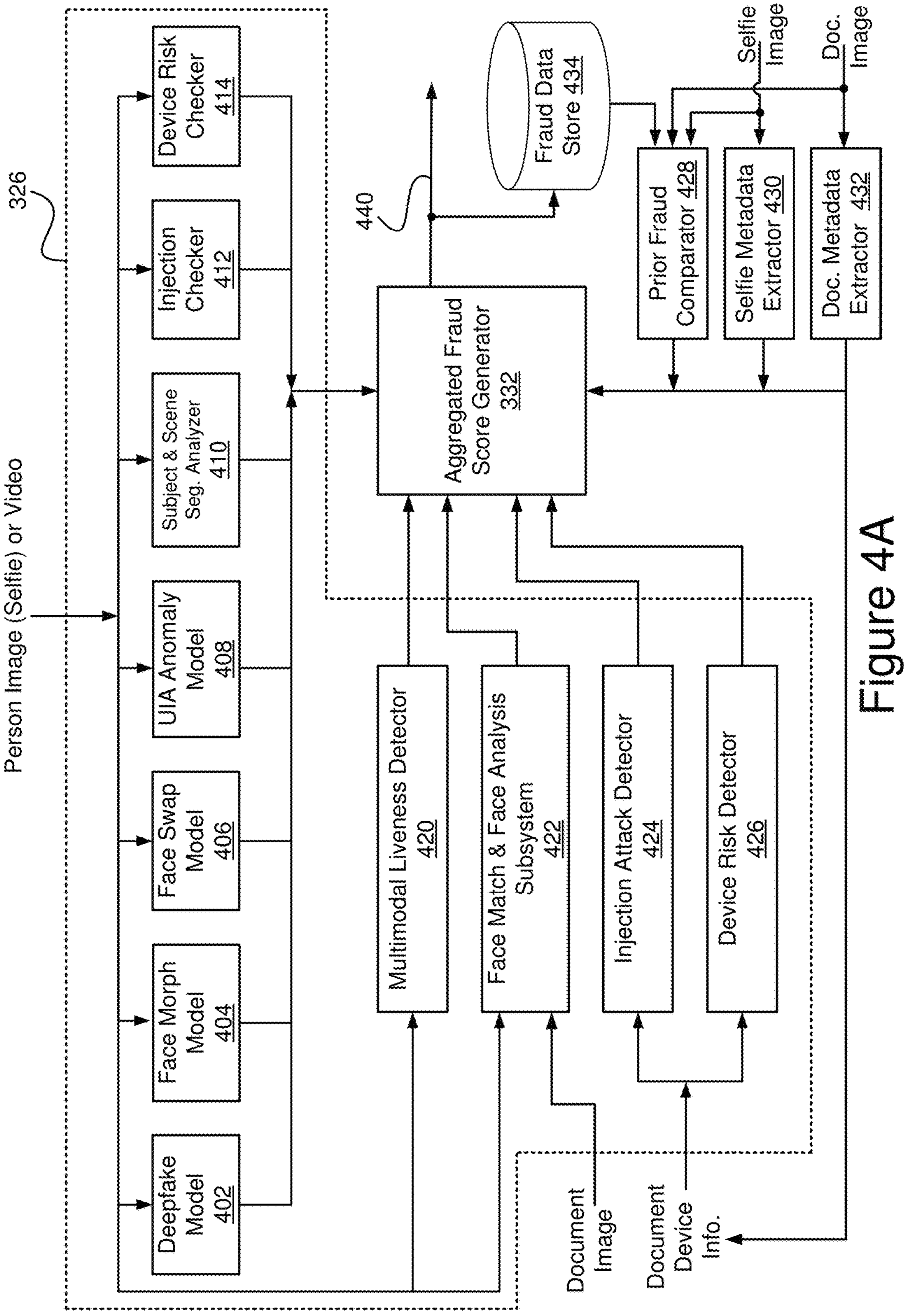
FIG. 4A is an illustration of a first example anti-injection attack system in accordance with some implementations.

Referring now to FIG. 4A, a first example anti-injection attack system 326 in accordance with some implementations is shown. FIG. 4A also shows the coupling of the anti-injection attack system 326 to the aggregated fraud score generator 332. The aggregated fraud score generator 332 is also coupled to receive additional information signals from a selfie metadata extractor 430 and a document metadata extractor 432 that process images to provide additional information to the aggregated fraud score generator 332. For example, the additional information may be extracted metadata such as EXIF that is added to the image by the camera or XMP that is added images by a photo editor. The selfie metadata extractor 430 receives the same selfie image that is input into the anti-injection attack system 326. The selfie metadata extractor 430 processes the received image and generates selfie metadata associated with the image. For example, the selfie metadata may include time and location information about when the photo was taken, geolocation, device type or model, device settings, device manufacturer, camera settings, JPEG header information, etc. The selfie metadata extractor 430 outputs this selfie metadata to the aggregated fraud score generator 332. Similarly, the document metadata extractor 432 receives an image of a document, for example, an ID card, and generates document metadata associated with the image of the document it received. The document metadata extractor 432 is coupled to provide the document metadata to the aggregated fraud score generator 332. For example, the document metadata may include data time and location information about when the photo of the ID was taken, device type or model, device settings, device manufacturer, as well as camera settings. Thus, if the metadata from the selfie image is very different from the metadata from the document image, it is indicative of a fraudulent act, and this can be determined and signaled by the aggregated fraud score generator 332.

Different injection attacks may use different deepfake, face morph, and face swap generative AI techniques, and each technique may create a different set of artifacts. Depending on the implementation, the anti-injection attack system 326 may train individual models, e.g., an individual model for each of the various injection attack techniques (e.g., deepfake, face morph, and face swap generative AI techniques) or may train a model for a combination of multiple injection techniques. It should be noted that while face swap and face morph are described with reference to generative AI techniques, they may not necessarily rely on generative AI methods, and the functionality and features described herein may generate one or more models to detect artifact(s) associated with those other techniques.

In some implementations, the anti-injection attack system 326 trains one or more detection models based on a training set of images (document, selfie, or a combination thereof) including images generated using an array of popular open-source deepfake/face swap/face morph generative AI techniques including GAN-based synthetic faces, diffusion model-based synthetic faces, and auto-encoder-based methods. In some implementations, the training set does not include any production injected images (e.g., deepfakes submitted by nefarious users to defeat a verification process), at least initially. In some implementations, the models of the anti-injection attack system 326 may be retrained or use reinforced learning based on images, including deepfakes, face swaps, face morphs, etc., that are encountered in production to improve performance and/or adapt as injection attack technology advances. The anti-injection attack system 326 may train the one or more detection models using a variety of machine learning techniques, depending on the implementation and use case, including supervised learning, unsupervised learning, semi-supervised learning, etc. The varieties of supervised, semi-supervised, and unsupervised machine learning algorithms that may be used, by the anti-injection attack system 326, to train the one or more injection detection models are so numerous as to defy a complete list. Example algorithms include, but are not limited to, a decision tree; a gradient boosted tree; boosted stumps; a random forest; a support vector machine; a neural network; a recurrent neural network; a recurrent neural network; deep learning; long short-term memory; transformer; logistic regression (with regularization), linear regression (with regularization); stacking; a Markov model; Markov chain; support vector machines; and others.

In some implementations, the anti-injection attack system 326 uses a single frame (e.g., a single still image submitted by the user or a single frame from a selfie that's video). In some implementations, the anti-injection attack system 326 applies facial detection. In some implementations, the facial detection is used in training the injection detection model, so the model concentrates on the facial features and/or immediately surrounding area, which may be where artifacts from injection are most likely to be present. In some implementations, the anti-injection attack system 326 uses video and multiple frames of images provided by the image receiver 322.

In some implementations, the anti-injection attack system 326 may train one or more detection models that is a binary classifier. For example, the anti-injection attack system 326 trains multiple binary classifier models using backbone networks like ResNet-34 or EfficientNet and the anti-injection attack system 326 applies the best performing binary classifier (as determined during validation) in production. In production, the injection detection model will be applied to image data provided by users (e.g., customers during an onboarding process) responsive to a request (e.g., for verification). In some implementations, the anti-injection attack system 326 may apply an ensemble method, e.g., by collating the inference results from multiple models to reach a conclusion.

It should be recognized that, while the foregoing example uses a binary classifier (i.e., two classes—one class associated with the presence of injection and the other class associated with an absence of injection), depending on the implementation more and/or different classes may be present. For example, in some implementations an "inconclusive" class may be present. It should further be recognized that while classification is described above, in some implementations, the anti-injection attack system 326 may apply a regression model to predict a numerical or continuous value, such as a probability that injection is present.

As shown in FIG. 4A, the anti-injection attack system 326 comprises a deepfake model 402, a face morphed model 404, a face swap model 406, an unknown injection attack (UIA) anomaly model 408, a subject and scene segmentation analyzer 410, an injection checker 412, a device risk checker 414, a multimodal liveness detector 420, a face match and face analysis subsystem 422, an injection attack detector 424, and a device risk detector 426. The deepfake model 402, the face morphed model 404, the face swap model 406, the UIA anomaly model 408, the subject and scene segmentation analyzer 410, the injection checker 412, the device risk checker 414, the multimodal liveness detector 420, and the face match and face analysis subsystem 422 are each coupled in parallel to receive an input image or video and provide their output to the aggregated fraud score generator 332. For example, the input image is most typically an image of a person or a selfie. The face match and face analysis subsystem 422 is also coupled to receive a document image. The injection attack detector 424 and the device risk detector 426 are coupled to receive document device information. In some implementations, this document device information is received directly. In other implementations, this document device information is the same information sent to the aggregated fraud score generator 332 that is extracted an output by the document metadata extractor 432. The injection attack detector 424 and the device risk detector 426 are also coupled to provide their output to the aggregated fraud score generator 332. The deepfake model 402, the face morphed model 404, the face swap model 406, the UIA anomaly model 408, the subject and scene segmentation analyzer 410, the injection checker 412, the device risk checker 414, the multimodal liveness detector 420, and the face match and face analysis subsystem 422 may each be steps, processes, functionalities, software executable by a processor, or a device including routines to perform the operation and functionality described below for each component.

On obtaining or receiving the selfie image or video, the anti-injection attack system 326 determines whether it is a valid selfie of a live individual or a fraud attack. To determine if it is an attack, the anti-injection attack system 326 analyzes the selfie by a series of models 402, 404, and 406 trained on previously seen deepfake, face morph and face swap attack examples. The anti-injection attack system 326 also processes the selfie with the UIA anomaly model 408 to determine whether it may be an unknown injected attack. In parallel, the device is checked to see if it has been used before in fraud attacks by the injection checker 412, in particular, whether the image is an injection attack bypassing the camera is in play; and the device risk checker 414 determines if the cameras and images/videos used in the process have clean metadata. In some implementations, a fraud data store 434 stores a fraud database of previously seen fraud attacks and the images used for those fraud attacks. In such an implementation, any of the components of the injection attack system 326 may access the fraud database to check if a person, image, signature, PII real or false data has been processed before. Additionally, the selfie image and the document image are also sent to a prior fraud comparator 428. The prior fraud comparator 428 also has access to retrieve prior known fraud images, fraud assets (digital signature, hashes, etc.), image meta data, or prior fraud detection signals from the fraud data store 434. The prior fraud comparator 428 can query the fraud data store 434 for any images or fraud assets in the fraud data store 434 that match the selfie image or the document image. The prior fraud comparator 428 compares the received selfie image and the received document image to any images or fraud assets used in prior fraud attacks and signals the aggregated fraud score generator 332 if there is a similarity match. Effectively, the prior fraud comparator 428 accesses the fraud data store 434 or any other location that stores prior confirmed fraudulent images or data and compares the selfie image and the document image to perform a series of checks on all incoming data with previously seen fraud assets. It should be noted that the fraud data store 434 is also coupled to signal line 440 to receive images that are confirmed to be fraudulent by the aggregated fraud score generator 332.

Two further checks are performed, namely multimodal liveness check by the multimodal liveness detector 420 and subject and scene segmentation analysis by the subject and scene segmentation analyzer 410. The scores from each of these individual components 402, 404, 406, 408, 410, 412, 414, and 420 are provided as input to the aggregated fraud score generator 332. An image of the document or document scan, document device information and associated metadata used to capture the document are also used to assess an attack by the anti-injection attack system 326.

The anti-injection attack system 326 also receives document device information and a document image or document scan. In the case of the document scan, the holder image of the document scan is assessed by the face match and face analysis subsystem 422 against the selfie for a face match. The face match and face analysis subsystem 422 also analyzes the selfie and compares it to the gender, age, etc. on the document for a match. The face match and face analysis subsystem 422 outputs a signal representative score to the aggregated fraud score generator 332. The document device information is used by the injection attack detector 424 and the device risk detector 426 to determine if the device used to capture the document was used in prior fraud attacks and also if the document was injected. In some implementations, the device risk detector 426 can be a component provided by a third party. These checks and subsequent scores are also sent to the aggregated fraud score generator 332.

The deepfake model 402, the face morphed model 404, the face swap model 406 are models to detect these specific types of image generation techniques used by of images by fraudsters. Examples of such models have been described above.

The UIA anomaly model 408 is a model to detect injections attacks that have not been seen before. In some implementations, the UIA anomaly model 408 is a model to detect suspicious behavior that deviates from normal behavior. The UIA anomaly model 408 also detects threats and shows the corresponding threats when suspicious events corresponding to rules created through an attack profile are constantly occurring. The UIA anomaly model 408 may also be configured to detect malicious processes. The UIA anomaly model 408 generates a signal that can be used by the aggregate score generator as 332 in generating the accumulated score.

The subject and scene segmentation analyzer 410 processes the selfie image to detect segments of an image that have been used by fraudsters in the past. Example implementations for the subject and scene segmentation analyzer 410 will be described in more detail below with reference to FIG. 5. The subject and scene segmentation analyzer 410 is particularly advantageous because it can detect similarities and portions of an image that a fraudster has repeatedly used. The subject and scene segmentation analyzer 410 is also advantageous because it reduces the computational requirements by only having to process a portion of the scene and has increased accuracy due to scene segments having a greater degree of similarity. The subject and scene segmentation analyzer 410 outputs its score to the aggregated fraud score generator 332.

The injection checker 412 receives the selfie image and checks whether the selfie image was used in an injection attack in the past as has been described above, and if so, signals the aggregated fraud score generator 332.

The device risk checker 414 receives the selfie image, extracts the metadata from the selfie image and determines whether the metadata from the selfie image indicates whether the used to take the selfie has been used in a prior fraud attack in the past as has been described above, and if so, signals the aggregated fraud score generator 332. In some implementations, the device risk checker 414 can be a component of a third-party or can use information from other large data providers or vendors, for example, Lexis-Nexis.

The multimodal liveness detector 420 receives the selfie image and performs multimodal liveness analysis. The multimodal liveness detector 420 processes the selfie and performs two or more liveness detection checks on the received selfie image. The results of the liveness analysis by the multimodal liveness detector 420 are provided to the aggregated fraud score generator 332.

The face match and face analysis subsystem 422 is coupled to receive the selfie image and also coupled to receive the document holder image. The face match and face analysis subsystem 422 performs two or more matching operations. The face match and face analysis subsystem 422 compares the selfie to the holder portion of the document image. Based on the comparison, the face match and face analysis subsystem 422 outputs a first signal to the aggregated fraud score generator 332. The face match and face analysis subsystem 422 also processes the document image to generate document holder characteristics, for example, age, gender, height, weight, eye color, etc. and analyzes the selfie image to determine whether the characteristics of the selfie image match the document holder characteristics. Based on the comparison, the face match and face analysis subsystem 422 outputs a second signal to the aggregated fraud score generator 332.

The injection attack detector 424 receives the document device information and checks whether the document device information is associated with a past injection attack. In some implementations, the injection attack detector 424 and the injection checker 412 perform the same processing merely on different input data sources, in particular, the injection attack detector 424 processes the document device information while the injection checker 412 processes the selfie image or video. In other implementations, the processing by the injection checker 412 and the injection attack detector 424 are different.

The device risk detector 426 receives the document device information, processes that metadata associated with the document, and determines whether the device is associated with the past fraudulent attempts. In some implementations, the device risk detector 426 and the device risk checker 414 perform the same processing merely on different input data sources, in particular, the device risk detector 426 processes the document device information while the device risk checker 414 checker processes the selfie image or video. In other implementations, the processing by the device risks checker 414 and the device risk detector 426 are different.

It should be understood that one particular advantage of the above-described architecture for the anti-injection attack system 326 is that it is scalable, and that additional models or other detection types may be added to process the selfie image in parallel with components 402, 404, 406, 408, 410, 412, 414, and 420. This is particularly advantageous to be able to add additional models of detection types as the fraudsters develop new types of attack. For example, although not shown in FIG. 4A, the anti-injection attack system 326 may also include a pose comparator. The pose comparator determines and compares a pose between multiple images. Assume that a request is associated with a first received input image is received that is a picture of a document with a document holder image (e.g., a picture ID)

and a second received input image that is a selfie, and that the person in the document holder image and selfie need to match otherwise the request is rejected (e.g., as fraudulent). However, too close of a match may be indicative of reproduction and, therefore, fraud. In some implementations, the pose comparator determines and compares a pose between a document holder image (e.g., from a document image) and a facial image (e.g., from a selfie or video that may also be used for liveness detection). Such an example pose comparator receives image data, determines the pose (e.g., applies pose estimation) to each of the images to be compared, and compares the poses. For example, the pose comparator receives a set of associated images (e.g., responsive to a verification request that includes a selfie image and a document image), determines the pose of the document holder's facial image (e.g., based on key points associated with various facial features), determines the pose of the face in the selfie, and compares the pose to the selfie image. In a valid instance it is very unlikely, near impossible, that the user's pose (e.g., the pitch, roll, and yaw of the head or face and/or a facial expression) in the selfie would reproduce (i.e., be identical or nearly identical) the user's pose in the user's own document holder image. The pose comparator compares the poses and determines whether the pose between images satisfies a similarity threshold. The similarity threshold, when satisfied, may be indicative that the poses are sufficiently similar, which may be indicative of fraud. In some implementations, there may be multiple thresholds. For example, a first threshold of high pose similarity when satisfied may be associated with and indicative of fraud, a second threshold of moderate pose similarity, when satisfied may be associated with and indicative of inconclusiveness, and when neither the first or second threshold are satisfied it may be indicative of validity or an absence of fraud. The number of thresholds, or classification, may vary, e.g., in some implementations, there may be a single threshold (or two classes-one indicative of a suspiciously high pose similarity and another associated with non-suspicious pose similarity). In some implementations, the threshold(s) or classes may be determined using machine learning. For example, a classifier is trained to classify pairs of images (e.g., document image and selfie) into suspicious and non-suspicious classes based at least in part on their pose similarity score. The pose comparator is merely one example of new and additional fraud detection types that may be added to the anti-injection attack system 326.

In some implementations, the deepfake model 402, the face morphed model 404, the face swap model 406, the unknown injection attack (UIA) anomaly model 408, the subject and scene segmentation analyzer 410, the injection checker 412, the device risk checker 414, and the multimodal liveness detector 420 may receive and process the document image in addition to the person image or selfie. In such a case, the deepfake model 402, the face morphed model 404, the face swap model 406, the UIA anomaly model 408, the subject and scene segmentation analyzer 410, the injection checker 412, the device risk checker 414, and the multimodal liveness detector 420 each outputs two signals to the aggregated fraud score generator 332, one signal or score for the selfie image and one signal or score for the document image. This is advantageous because it increases the accuracy of the fraud detection by having both the selfie image and the document image process by each detector type.

The aggregated fraud score generator 332 receives signals from the components 402, 404, 406, 408, 410, 412, 414, 420, 422, 424, and 426 and uses those signals to generate an aggregate fraud signal on signal line 440. In one implementation, the components 402, 404, 406, 408, 410, 412, 414, 420, 422, 424, and 426 each generate a numerical score within a predefined range with one end of the range indicating fraud and the other end the range indicating the absence of fraud. The aggregated fraud score generator 332 combines those scores to produce the aggregated fraud signal. The aggregated fraud signal has a value between a minimum and maximum where a value satisfying a threshold between the minimum and maximum indicates that the selfie is an acceptable image, and a score or value that does not satisfy the threshold is a fraudulent image or an injection attack. For example, the aggregated fraud score generator 332 may be a gradient boosting machine learning model, e.g., XGBoost, trained on hundreds of parameters to provide an overall score. The output from components 402 to 432 could be scores between 0 and 1 and used to train the gradient boosting machine learning model with these signals or could feed another aggregated model trained only on the signals from the subsystems in FIG. 4. In some implementations, the numerical scores from each component 402, 404, 406, 408, 410, 412, 414, 420, 422, 424, and 426 are weighted to generate the aggregated fraud signal. In another implementation, some of the signals from the components 402, 404, 406, 408, 410, 412, 414, 420, 422, 424, and 426 input to the aggregated fraud score generator 332 are binary signals indicating the presence of fraud (false) or the absence of fraud (true). In such a case, the aggregated fraud score generator 332 includes logic to output a true signal indicating an image is acceptable or a false signal indicating the presence of fraud if any one of the components 402, 404, 406, 408, 410, 412, 414, 420, 422, 424, and 426 input a signal indicating the presence of fraud into the aggregated fraud score generator 332. In yet another implementation, the aggregated fraud score generator 332 includes logic that combines scores within a predefined range from some of the components 402, 404, 406, 408, 410, 412, 414, 420, 422, 424, and 426, and binary signals indicating the presence of fraud or the absence of fraud from other of the components 402, 404, 406, 408, 410, 412, 414, 420, 422, 424, and 426 to generate one or more aggregated fraud signals indicating the presence or absence of fraud for the selfie image submitted.

Referring now to FIG. 4B, a second example anti-injection attack system 326 in accordance with some implementations is shown. In this second example, like components with the same or similar functionality have the same reference number is used in FIG. 4A. Since that functionality has been described above with reference to the description of FIG. 4A above, that description will not be repeated here. As shown in FIG. 4B, the acquisition channels for the selfie or video image are shown in more detail. The selfie or video image may be received by an application programming interface (API) 452, via the Internet or the World Wide Web using a web browser 450, or via a mobile device 454. Each of these individual channels may capture the video or selfie image that is provided as input to the anti-injection attack system 326 with the scalable architecture. The same selfie image is also provided to the multimodal liveness detector 420 and the selfie metadata extractor 430 as has been described above. Another notable difference in this second example of the anti-injection attack system 326 is that the deepfake model 402, the face morphed model 404, and the face swap model 406 are replaced by one model or an ensemble of models. For example, FIG. 4B shows them replaced by a multi-frame deepfake detection model 416 and a single frame deepfake detection model 418. In some implementations, the multi-frame deepfake detection model 416 and a single frame deepfake detection model 418 operate similar to the models described above but just operate on either multiple frames of images or single frame of an image. In some implementations, the multi-frame deep fake detection model 416 is a convolutional vision transformer. The transformer has two components, namely, a Convolutional Neural Network (CNN) and a Vision Transformer (ViT). The CNN is used to extract learnable features while the ViT uses the learnable features as input and categorizes them using an attention network. The multi-frame deep fake detection model 416 is trained using a sizable deepfake video dataset. It should be understood that this is only one example approach for detecting deepfake multi-frame attacks, and that numerous other methods may be used for the multi-frame deep fake detection model 416. In some implementations, for detecting single frame deepfake images, the single frame deepfake detection model 418 may be a binary classifier based on a two-phase learning scheme. The first phase is designed to find distinguishing features for fake images. The second phase is a two-layer CNN that takes the feature encodings from the first phase and outputs a real/fake classification decision. Again, it should be understood that this is only one example approach for detecting deepfake single-frame attacks, and that numerous other methods may be used for the single frame deepfake detection model 418.

Figure 5:
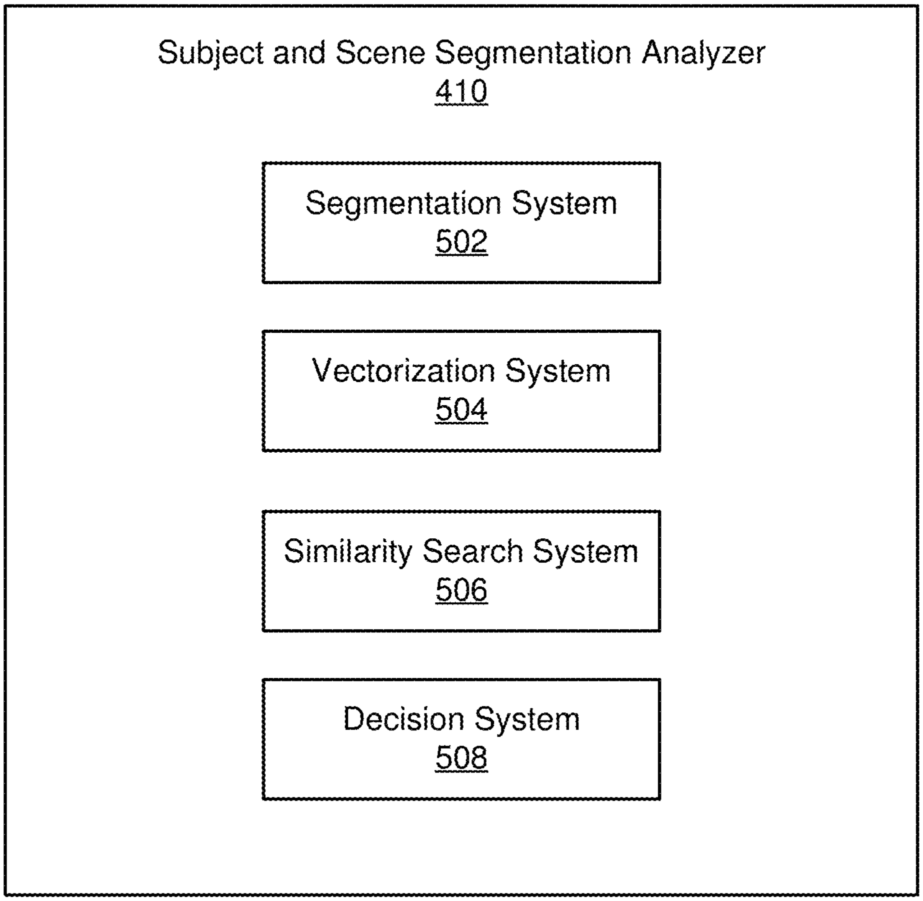
FIG. 5 is an illustration of an example subject and scene segmentation analyzer in accordance with some implementations.

FIG. 5 shows an example subject and scene segmentation analyzer 410 in accordance with some implementations. In some implementations, the subject and scene segmentation analyzer 410 comprises a segmentation system 502, a vectorization system 504, a similarity search system 506 and a decision system 508. By segmenting the selfie image into discrete components and analyzing the components individually, a direct or similarity match can be performed against previously discovered fraud selfie image attacks. Additionally, new fraud attacks can be discovered by identifying large clusters formed by similar images. Deepfake or other document creation mechanisms are now becoming more commonly seen during the ID verification process. Using images of the entire documents directly, with holder image and PII data present, creates more complications for detecting fraudulent cards. The subject and scene segmentation analyzer 410 determines "regions of interest" containing the images and PII data of the document and eliminates them from the incoming scanned document using predetermined "region of interest" masks in the "Document Assembly Object" (DAO) and uses either an ML model previously trained on both valid ID's and fraudulent IDs to determine a fraudulent document or, alternatively, an anomaly detection method to separate valid from fraudulent documents.

Figure 17A:
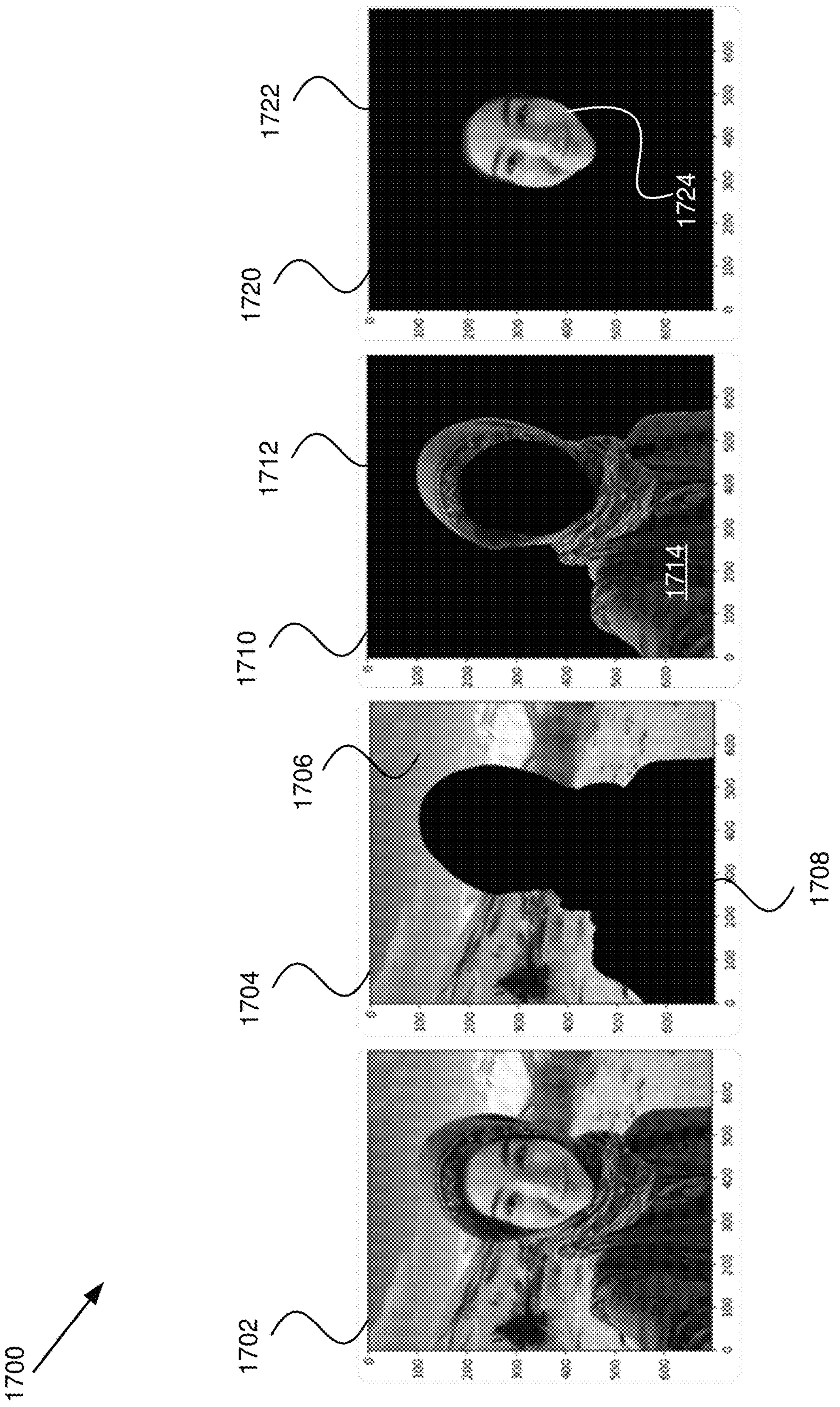
FIG. 17A is an illustration of an example set of images used to show how partial image search and image segmentation is performed.

The segmentation system 502 involves decomposition of an image into one or more different portions. The segmentation system 502 can be applied to either a selfie image or a document image. In some implementations, the segmentation system 502 receives images that are known to be fraudulent and decomposes them into one or more different parts or segments. Either the selfie image or the document image may be decomposed into particular portions that make detection of similarity computationally less expensive and more accurate. The segmentation system 502 may be steps, processes, functionalities, software executable by a processor, or a device including routines to segmenting image into one or more different portions. In some implementations, the segmentation system 502 decomposes a selfie image into a background, a head, a hairstyle/shape, a neck, and shoulders. For example, the background segment eliminates the entire subject (head, hairstyle/shape, neck, shoulders, and clothing) from the image. An example head segment eliminates the background, neck, shoulders, and clothing from the image. An example hairstyle/shape segment eliminates everything from the image except for the hairstyle/shape. An example neck segment eliminates the background, head, hairstyle/shape, and shoulders from the image. An example shoulders and clothing segment eliminates the background, head, and hairstyle/shape. The segments may also include body-skin, face-skin, facial features, etc. A different example of segmentation of an image 1702 into a background segment 1706, body segment 1714, and a face segment 1724 are shown in FIG. 17A. It should be understood that any number of different segments may be applied to a given image. In one example, the segmentation system 502 is the media pipe selfie segmenter. Based on the attributes of fraudulent images that have been submitted, those images can be analyzed to determine which segments are repeatedly used with a high frequency of similarity. The segmentation system 502 is coupled to provide the segmentation once defined to the vectorization system 504.

The vectorization system 504 receives the segmentation of an image, e.g., the segmented parts of the image from the segmentation system 502. The vectorization system 504 passes one or more of the segmented parts of the image through a neural network to generate one or more vector embeddings. In some implementations, vectorization system 504 may each be steps, processes, functionalities, software executable by a processor, or a device including routines to generate the vector embedding. In some implementations, the vectorization system 504 can be obtained on training for the task specifically or by transfer learning from other domains, to obtain a vector embedding. The vectorization system 504 sends the vector embedding to the similarity search system 506. It should be understood that the vectorization system 504 may receive many segmentations for many different images and for each of them generates a different vector embedding. The set of vector embeddings can be provided to the similarity search system 506.

The similarity search system 506 searches for the similarity checks of the vector embedding of the query scan against an index of embeddings from previous transactions. The similarity search system 506 may each be steps, processes, functionalities, software executable by a processor, or a device including routines to perform the searches for similarity checks based on the vector embedding. In some embodiments, the similarity search system 506 searches for cosine similarities between embeddings in a N-by-N matrix. In one example, the similarity search system 506 identifies similar scans based on using the status. In another example, the similarity search system 506 performs a blind search to determine whether there are a predefined Y number of items above an X similarity threshold. The results of the similarity search system 506 are provided to the decision system 508.

The decision system 508 receives the search results from the similarity search system 506 and generates a decision on whether the scanned image is fraudulent or not. The decision system 508 may each be steps, processes, functionalities, software executable by a processor, or a device including routines to generate the decision on whether a scan image is fraudulent. In some implementations, the decision system 508 uses two different modes to determine whether an input image is fraudulent. In a first mode, the decision system 508 determines whether the input image has matched a previously discovered fraudulent case. For example, if the vector embedding for the scanned image matches a vector embedding for a prior image known to be fraudulent, the input image is identified as being fraudulent. If so, the input image is identified as fraudulent. In a second mode, the decision system 508 determines whether the input image has matched a large number of prior scans, and it fulfills certain requirements, e.g., a large ratio of the segmented portion of the whole image matches similar segments of the images known to be fraudulent. For example, if the vector embedding for the scanned image matches a predefined number of vector embedding for images that are known to be fraudulent, the input image is identified as being fraudulent.

Example Methods

FIGS. 6-12 are flowcharts of example methods 600, 700, 800, 900, 1000, 1100, and 1200 that may, in accordance with some implementations, be performed by the multiple fraud type detector 226 described above with reference to FIGS. 1-5. The methods 600, 700, 800, 900, 1000, 1100, and 1200 of FIGS. 6-12, respectively, are provided for illustrative purposes, and many variations exist and are within the scope of the disclosure herein.

Figure 6:
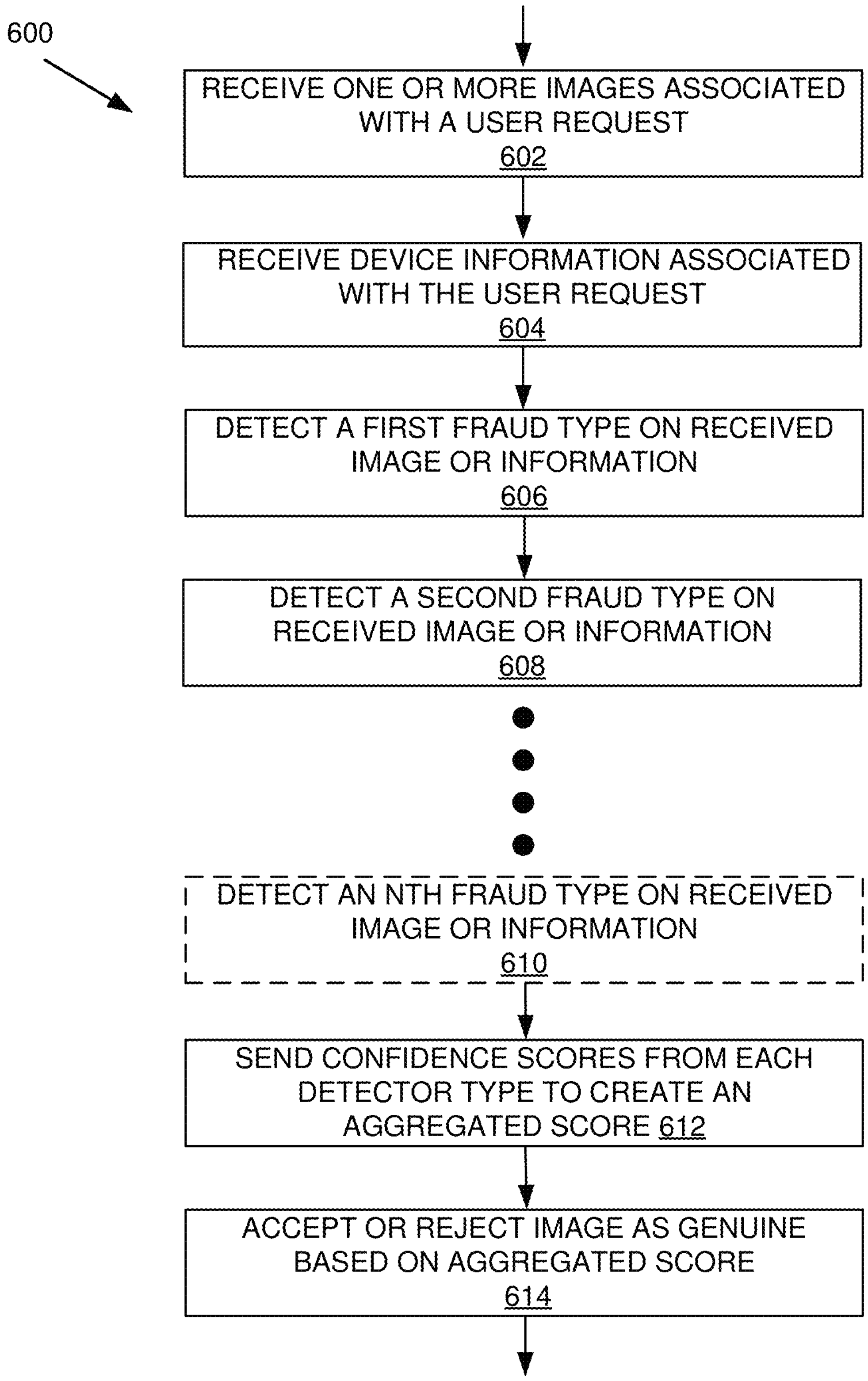
FIG. 6 is a flowchart of an example method for multiple fraud type detection in accordance with some implementations.

FIG. 6 shows an example general method 600 for multiple fraud type detection in accordance with some implementations. The method 600 begins by receiving 602 one or more images associated with the user request. As noted above, this could be a selfie alone, a selfie image as well as a document image, or it could be a plurality of images of either type, or it could be a video. The method 600 continues by receiving 604 device information associated with the user request. For example, this may be the metadata associated with the device that captured the image(s) in block 602. The method 600 continues to detect 606 a first fraud type using the received image or information. For example, this may be any one of the fraud detection types identified above in the anti-injection attack system 326 shown in FIG. 4A above. More specifically, the first fraud type may be any detection for one of: a deepfake, a face morph, a face swap, an unidentified injection attack anomaly, an injection attack, a device attack, a partial image search, multimodal liveness, or a face match. The method 600 continues by detecting 608 a second type of fraud using the received image information. The second type of fraud may similarly be any one of the fraud detection types identified above in the anti-injection attack system 326 shown in FIG. 4A above, so long as it is not the same fraud type used in block 606. It should be understood that the method 600 of the present disclosure advantageously provides the ability to detect a plurality of different fraud detection types. The method 600 may continue to detect any number of additional fraud types identified by block 610 in FIG. 6. It should be understood that n may be any number greater than 2. Also, the additional fraud types are different than the fraud types detected in blocks 606 and 608. Block 610 in FIG. 6 is depicted with dashed lines indicating that it and any number of additional fraud type detection steps are optional. Based on each of the fraud types detected in block 606 to block 610, confidence scores are generated for each block, and the method 600 sends the confidence scores for aggregation in block 612. In block 614, the method 600 accepts or rejects the image received in block 602 as genuine based on the combined score generated in block 612. For example, if the aggregated score in block 612 satisfies the threshold, then the image is accepted as genuine whereas if the aggregated score does not satisfy the threshold, the image is rejected as fraudulent.

Figure 7:
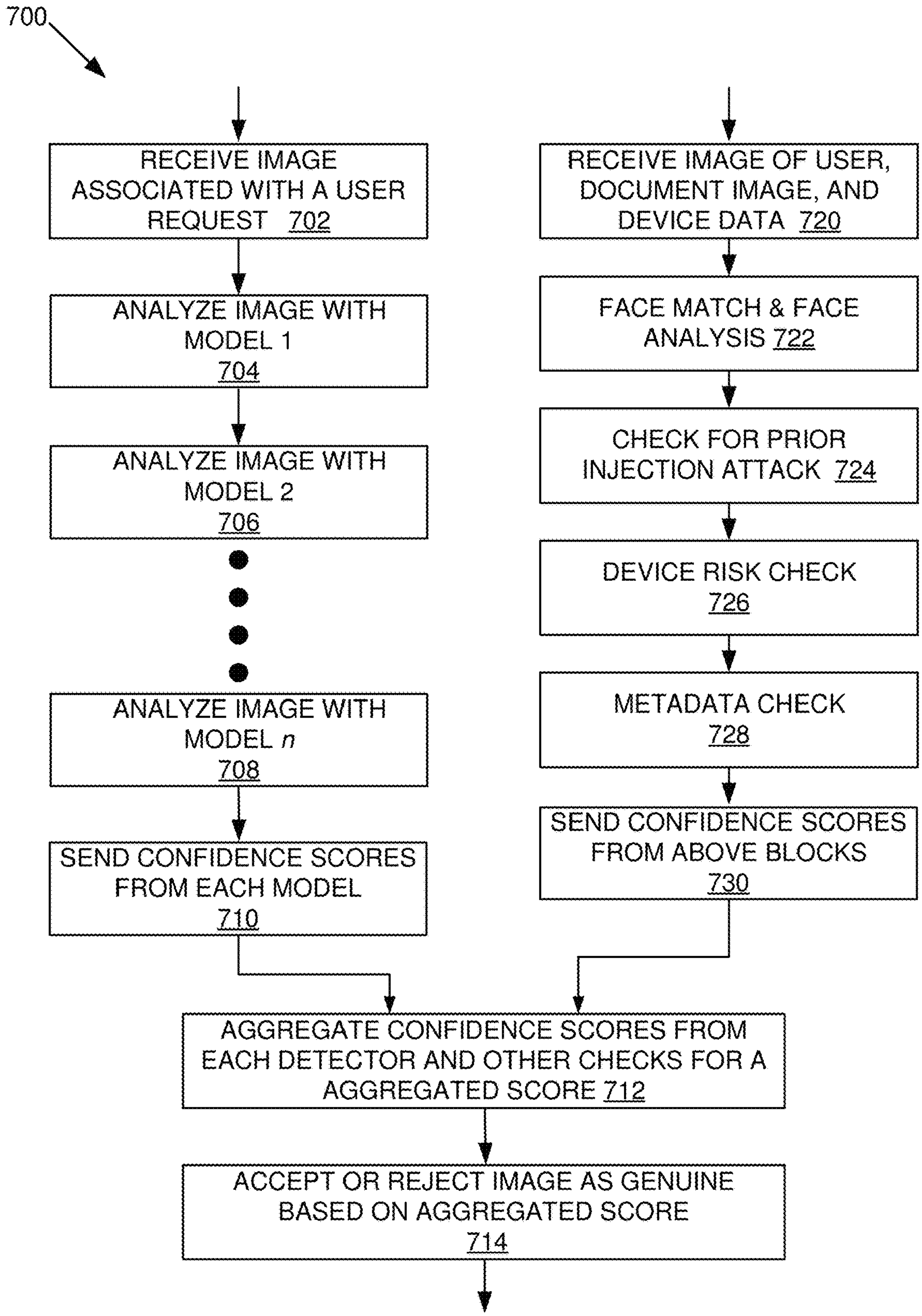
FIG. 7 is a flowchart of a second example method for multiple fraud type detection in accordance with some implementations.

FIG. 7 shows a second example method 700 for multiple fraud type detection in accordance with some implementations. The method 700 of FIG. 7 illustrates a process similar to the architecture of the anti-injection attack system 326 shown in FIG. 4A. In particular, the method 700 performs a plurality of checks for different types of fraud in parallel.

A first parallel process of the method 700 begins in block 702 by receiving an image associated with the user request. For example, this may be a selfie or video. Next, the method 700 analyzes 704 the image with the first model. Next, the method 700 analyzes 706 the image with the second model. This process continues with this any number of additional models analyzing the received image. Then the method 700 analyzes 708 the image with an nth model. In some implementations, this first parallel process provides an analysis block for each model that only requires the selfie image or video. For example, the first through nth models may include the deepfake model, the face morph model, the face swap model, the UIA anomaly model, the subject and scene sequence analysis or model, an injection checking model, a device risk checking model, and a multimodal liveness detector. This part of the parallel process completes with the blocks 704 to 708 sending 710 confidence scores for aggregation.

A second parallel process of method 700 begins in block 720 by receiving a selfie, a document image and device data. Next, the method 700 performs 722 a face match and face analysis using the selfie and the document image. The method 700 continues to check 724 for prior injection attacks using the device data received in block 720. Next, the method 700 checks 726 for device risk using the device data received in block 720. The method 700 continues by generating metadata from the selfie image and the document image and performing 728 metadata checks. The method 700 completes this second parallel process by sending 730 the confidence scores generated in blocks 722, 724, 726, and 728 for aggregation.

In some implementations, the image analysis performed in blocks 704, 706, 708, 722, 724, 726, 728, and 730 may be performed in several parallel processes in contrast to only the 2 parallel processes depicted in FIG. 7.

The method 700 continues by aggregating 712 the confidence scores from each detector and other check from both parallel processes into an aggregated score. Then the method 700 accepts 714 the images genuine if the aggregated confidence score satisfies a threshold or rejects the images as fraudulent if the aggregated score does not satisfy the threshold. The aggregated score satisfies the threshold, then the image is classified as genuine. If the aggregated score does not satisfy the threshold, then the image is classified as fraudulent.

Figure 8:
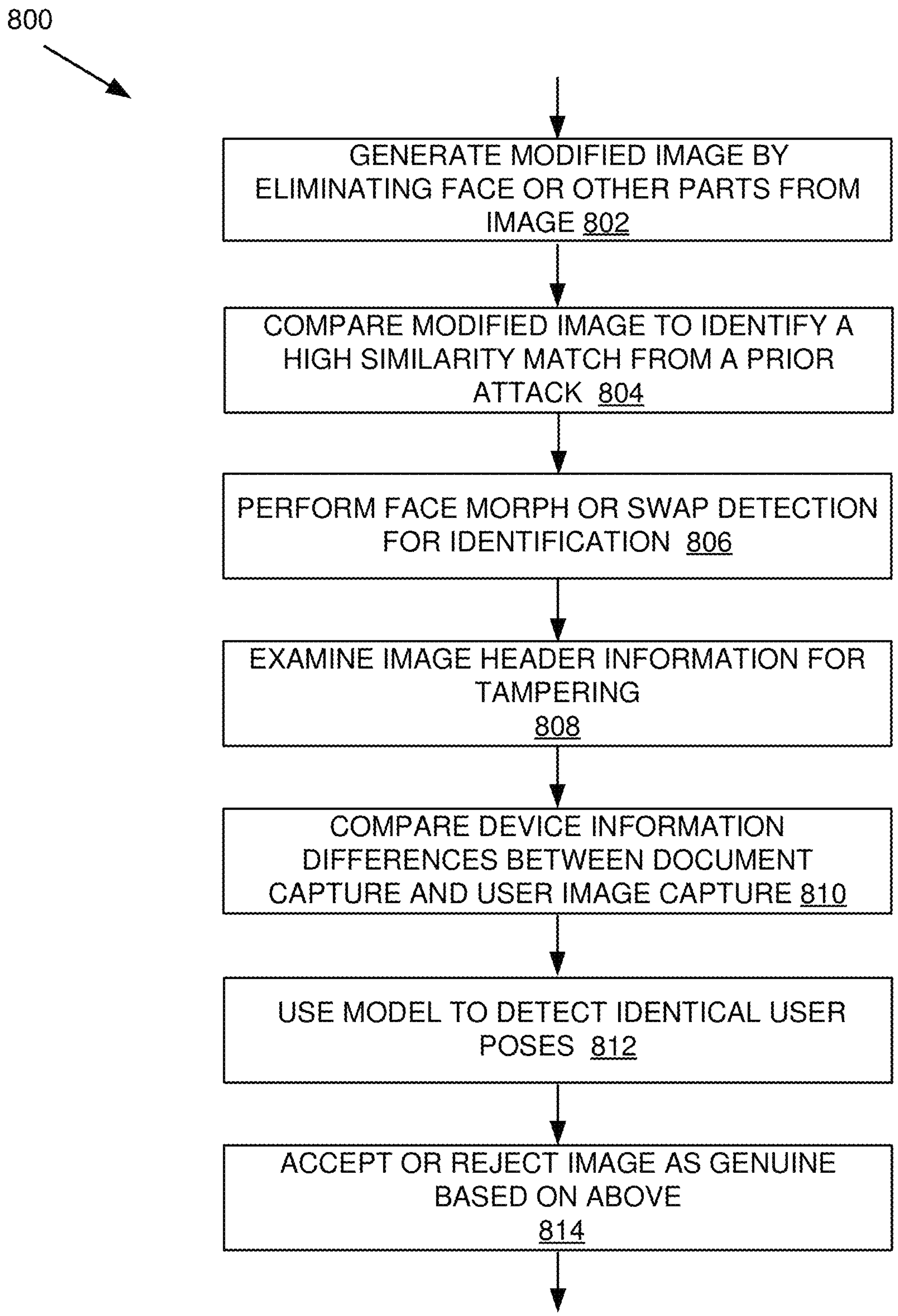
FIG. 8 is a flowchart of a first example method for detecting multiple fraud types in accordance with some implementations.

FIG. 8 shows a first example method 800 for detecting multiple fraud types in accordance with some implementations. In the example method 800 shown in FIG. 8, the anti-injection attack system 326 is used to detect instances where a document holder image is used to create a selfie face with a face swap or morphed selfie face. The method 800 begins by generating 802 a modified image by eliminating the face or other parts of the image. If this is a repeat fraud that was previously detected either automatically or via the customer, the face can be eliminated from the image and the background used to identify an identical match or a high similarity match from a previous attack with the same or similar background. Similarly, the head, the head and neck, the head and neck and shoulders may also be eliminated to improve the similarity match. For example, the subject and scene segmentation analyzer 410 may be used to perform this block. The method 800 proceeds to compare 804 the modified image to identify a high similarity match from a prior attack. It should be noted that one advantage of the present disclosure is that the image need not be identical but can have a similarity above a predefined threshold. In some implementations, this block 804 is performed by the similarity search system 506 of the subject and scene segmentation analyzer 410. The method 800 continues to perform 806 face morph or face swap detection for identification. For example, this block 806 may be performed by analysis of the received image by the face morphed model 404 and/or the face swap model 406. Either or both of these models 404, 406 may be a deep learning model adapted for identification. This approach still works even if you do not know the model/approach that created the face. In some implementations, a camera injection detection software solution can also be used. Next, the method 800 examines 808 the header information of the image for tampering. For example, the examining the image header information may reveal tampering using the tool such as Adobe Photoshop. The method 800 continues by comparing 810 information differences between document capture and user image capture. In particular, capture device information can be used to determine whether the document image and the selfie image were captured with the same device. For example, the impurities in the silicon of the camera between document capture and image capture. The method 800 continues by using 812 a model to detect identical user poses. The model may detect instances when the holder image of the document is a straight copy onto the selfie. Next, the method 800 accepts or rejects 814 the image as genuine based on the analysis performed above in blocks 804, 806, 808, 810 and 812.

Figure 9:
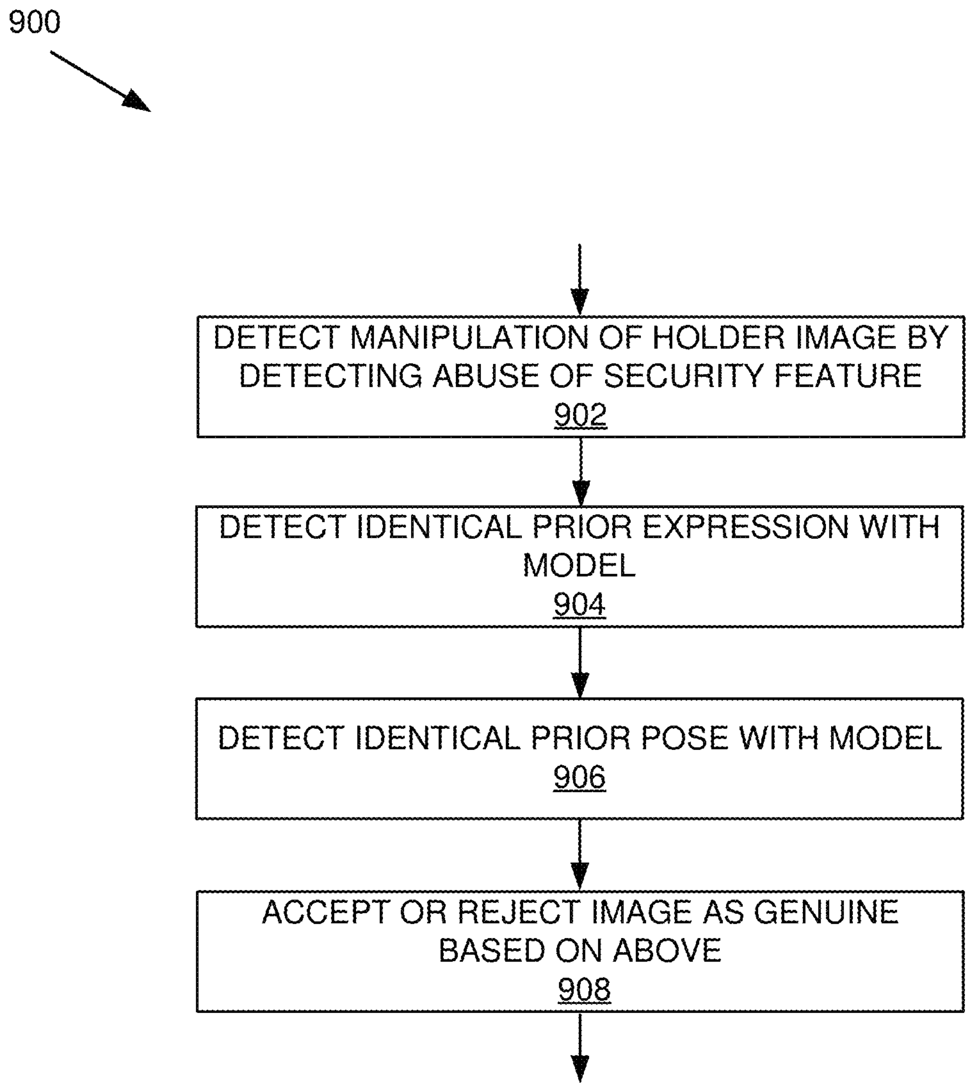
FIG. 9 is a flowchart of a second example method for detecting multiple fraud types in accordance with some implementations.

FIG. 9 shows a second example method 900 for detecting multiple fraud types in accordance with some implementations. In this second example, the method 900 is detecting instances where the fraudster has used a selfie image to create a document holder image. The method 900 detects 902 manipulation of the holder image by detecting the abuse of a security feature. One example of this is shown below FIG. 13 in which the fraudster abused the document security feature(s) e.g., microprint omitted in areas of the face of the user where the image was swapped out. The method 900 continues by detecting 904 an identical prior expression of the user in an image using a detection model. Next, the method 900 detects 906 and identical prior pose with a detection model. The pose and expression identical to the pose and expression used in a prior image can be detected using a detection module. The method 900 continues by accepting or rejecting 908 the image as genuine based on the evaluations done in blocks 902, 904, and 906.

Figure 10:
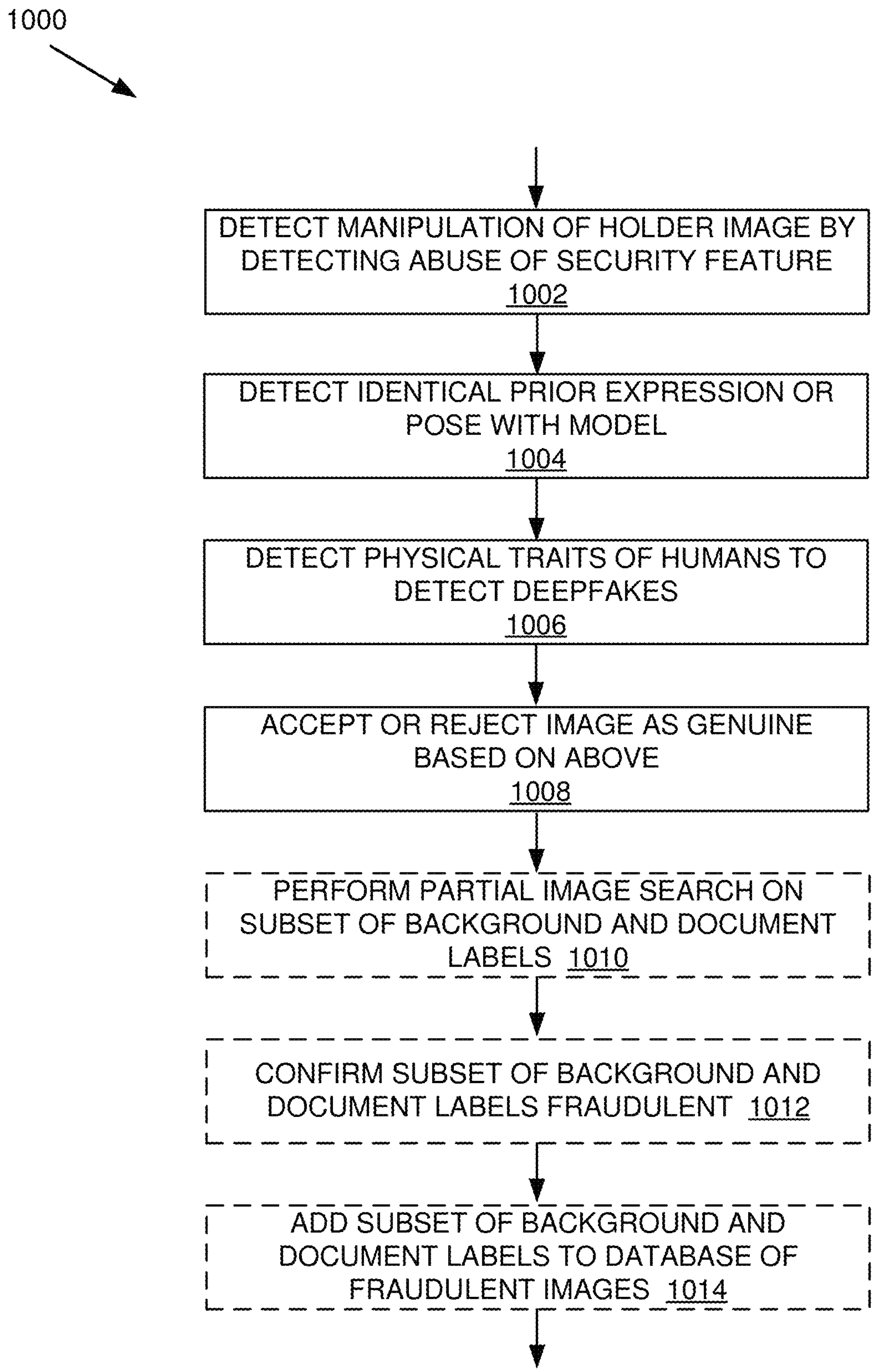
FIG. 10 is a flowchart of a third example method for detecting multiple fraud types in accordance with some implementations.

FIG. 10 shows a third example method 1000 for detecting multiple fraud types in accordance with some implementations. In this third example, the method 1000 is used to detect instances when the fraudster has generated deepfake on both the document holder image and the selfie. The method 1000 begins by detecting 1002 manipulation of the holder image by detecting abuse of the security feature on the holder image. Next, the method 1000 detects 1004 identical prior expressions or poses with a detection model. These may be localized facial expression manipulation. This detection 1004 can be applied to both the selfie and the document image. The method 1000 continues by detecting 1006 physical traits of the user (e.g., humans) to detect deepfake. For example, fraud detection models can be combined with software that creates a video sequence that can react to different prompts, e.g., to move towards the camera, or away from the camera. The model is then used to detect physical human traits such as eye blinking or artificial blinking patterns in deepfakes. Again, this detection 1006 may be applied to both the selfie and the document image. The method 1000 continues by accepting or rejecting 1008 the image as genuine based on the evaluations done in blocks 1002, 1004 and 1006.

It should be understood that the rejection of any images in these example detection methods 800, 900, 1000, and 1100 may be used to augment the information used by the detection models. Often fraudsters perform repeated attacks and reuse document images and selfie images with just a subset of the PII fields changed. In this case, the subject and scene segmentation analyzer 410 (partial image search) can use the background and document position to increase the accuracy of detecting fraudulent documents. The additional optional steps 1010, 1012, and 1014 depicted in FIG. 10 illustrate one example of how that information can be augmented. Once an image is rejected in block 1008, the method 1000 may continue to perform 1010 a partial image search on a subset a background and document labels. Then the method 1000 confirms 1012 that the subset of background and document labels are fraudulent. The method 1000 then adds 1014 the subset a background in document labels to a database of fraudulent images.

Figure 11:
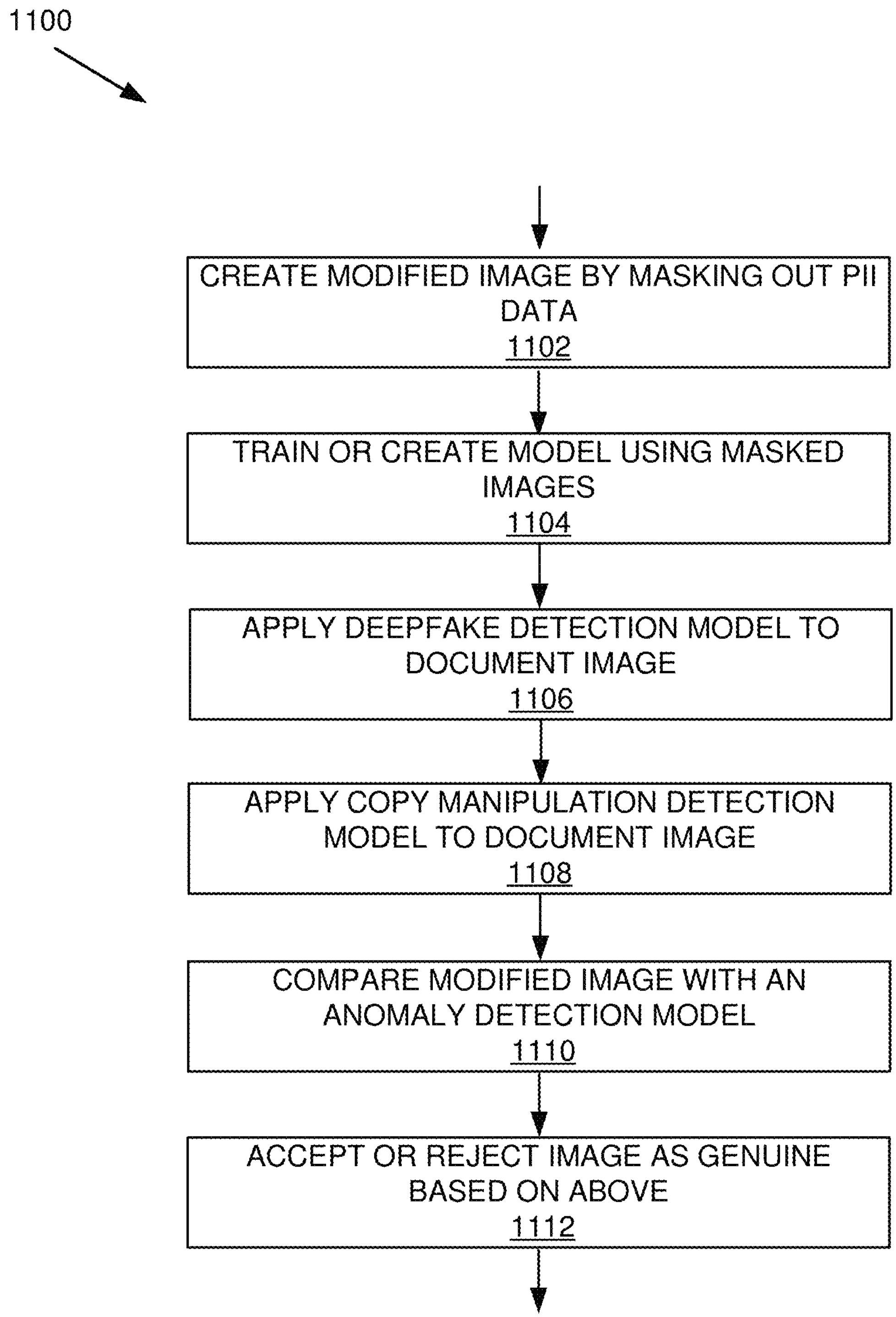
FIG. 11 is a flowchart of a fourth example method for detecting multiple fraud types in accordance with some implementations.

FIG. 11 shows a fourth example method 1100 for detecting multiple fraud types in document images in accordance with some implementations. The method 1100 first receives a document image. The method 1100 creates 1102 one or more modified images by masking out personal identifiable information (PII) data from images that have been determined to be repeatedly used by fraudsters. For example, ID documents repeatedly used by fraudsters would have the PII masked out. By masking the PII data out, it produces a detecting model free of noise added by the PII data making it more accurate in the detection of fraudulent documents. Next, the method 1100 trains or creates 1104 models using the masked images generated in block 1102. The method 1100 continues by applying 1106 a deepfake detection model to the document image. For example, the deepfake model 402 as described above can be applied to the document image. Then the method 1100 applies 1108 a copy manipulation detection model to the document image. For example, a model developed on synthetically generated ID cards can be used for this step. In another example, the detector masks out all the PII data on incoming document image and compares it using either a model or unsupervised anomaly detection method from previously obtained valid documents of this type. The valid document abstraction to be used for comparison is held in the document assembly object. The method 1100 continues by comparing 1110 a modified image with an anomaly detection model. Then the method 1100 accepts or rejects 1112 the image as genuine based on the evaluations done in blocks 1106, 1108, and 1110.

Figure 12:
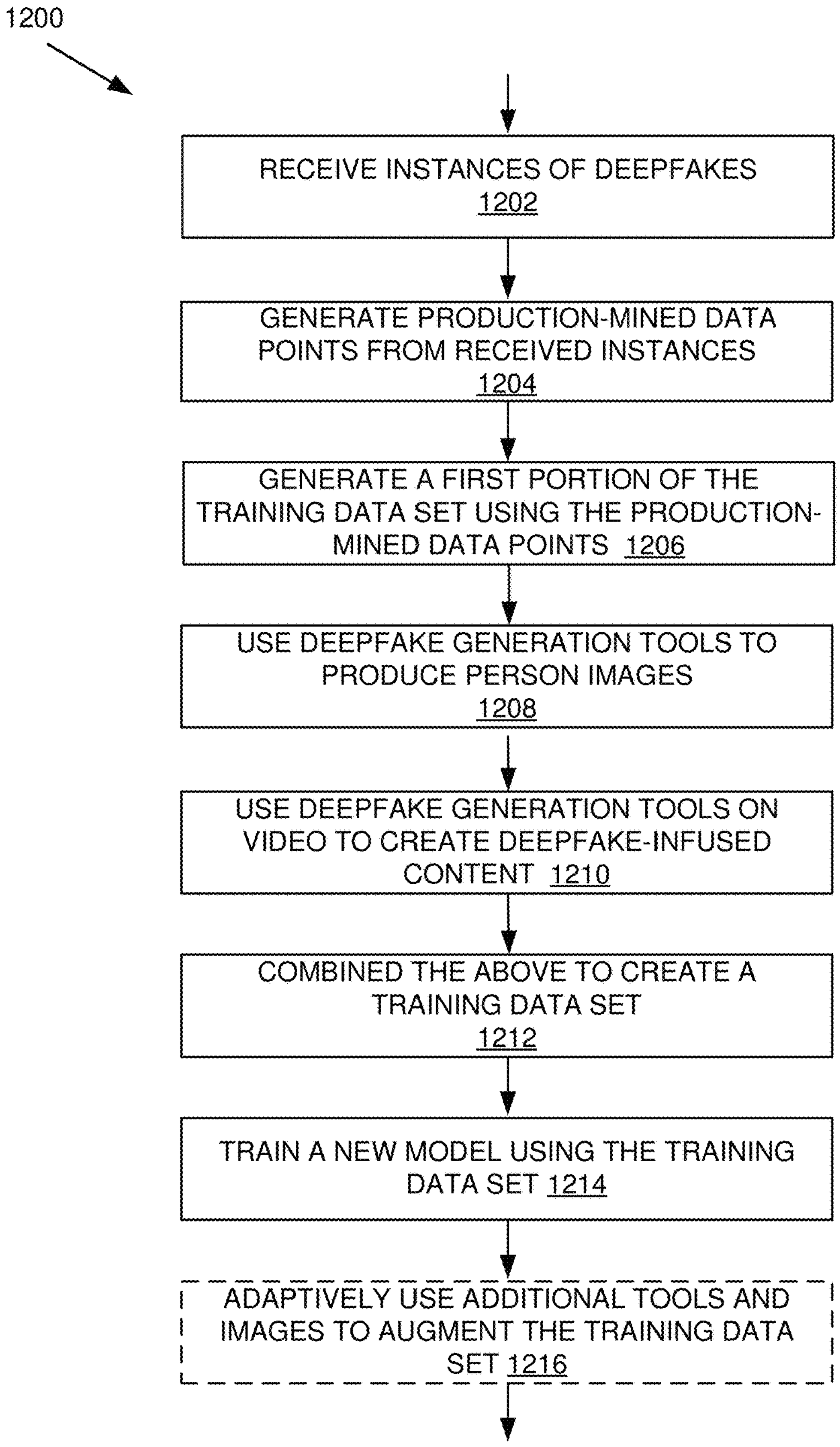
FIG. 12 is a flowchart of an example method for training models to detect multiple fraud types in accordance with some implementations.

FIG. 12 shows an example method 1200 for training models to detect multiple fraud types in accordance with some implementations. In order to train the deep learning model, a critical part is to create training datasets that mimic the popular attack patterns in public and in production. The present disclosure advantageously generates training data from for the deepfake detection model is meticulously curated from two primary sources, each serving a distinct purpose. Training multi-frame (video) deepfake detection models requires a dataset or datasets of considerable size and variety that are generally deepfake videos. Several datasets from Meta, Google, and others can be used for such training. The goal of method 1200 is to build a detection model that generalizes better to unseen deepfakes and different datasets helps with this issue. Training for a single frame deepfake detection model can follow the same process but also a different training method can be used. For example, model parsing can be used which is a reverse engineering approach which uncovers the unique patterns behind the AI model used. The method 1200 begins by receiving 1202 instances of images confirmed to be deepfakes. For example, authentic instances of deepfakes encountered in diverse real-world scenarios can be retrieved from the data store 228. Then the method 1200 generates 1204 production-mined data points from the image instances received in block 1202. In some implementations, these production-mined data points are generated by automated processes or software that searches and analyzes the image instances in order to identify patterns and extract useful information. These automated processes or software implement workflows (e.g., deepfake detector, repeated fraud match, partial image search, selfie subject and scene segmentation, etc.). For example, a single frame-based face swap/face morph can be identified from an API channel or real-time deepfake video injection via virtual camera. In other implementations, the production-mined data points are obtained from human audits of the image instances. In yet other implementations, the production-mined data points are combination of data points generated automatically and data points generated by human audits. These production-mined data points are invaluable, capturing the nuances and intricacies of genuine deepfake scenarios observed in various productions. Next, the method 1200 generates 1206 a first portion of the training data set from the production-mined data points. In this implementation, a second portion of the training data set is self-generated data. The self-generated data set includes a first part of single frame deep fakes and the second part of video-based defects. The method 1200 continues by using deepfake generation tools to produce 1208 a first part of a self-generated data set including user images or selfies. For example, there are tools for generating single frame deepfakes and tools available for generating deepfake videos. The output from these tools can be used as part of the dataset for the respective models training. This block 1208 uses both open-source and commercial tools to create digitally manipulated selfies. This block 1208 involves manipulating one or a pair of images to produce a single, high-fidelity output image. For example, the face swap/face morph techniques may be employed to generate the single frame deep fakes. Next, the method 1200 uses deep fake generation tools on video to create deepfake-infused content. These video-based deep fakes are the second part of the self-generated data set. Block 1210 involves manipulating real-time or recorded videos to create deepfake-infused content. It should be noted that the self-generated data set produced by block 1208 and 1210 are advantageously designed to replicate and expand upon the characteristics found in the detection of fraudulent images in production. In particular, the self-generated data set intentionally mirrors the images encountered in the real world. Next, the method 1200 combines 1212 the first portion of the training data set (production mined data points) with the second portion of the training data set (first and second parts of self-generated data) to create the final training data set. This is ensured to be a comprehensive and representative training data set. Next, the method 1200 uses the training data set to train 1214 a new model. The method 1200 may optionally augment 1216 the training data set. For example, the method 1200 may adaptively use additional tools and images to augment 1214 the training data set. The multiple fraud type detector 226 advantageously modifies and updates self-generated dataset continuously or periodically to match images observed during operation/production because of the dynamic nature of the deepfake landscape. This allows the training data set to be modified to mirror the ever-evolving characteristics of deepfakes encountered in the real world.

Figure 13:
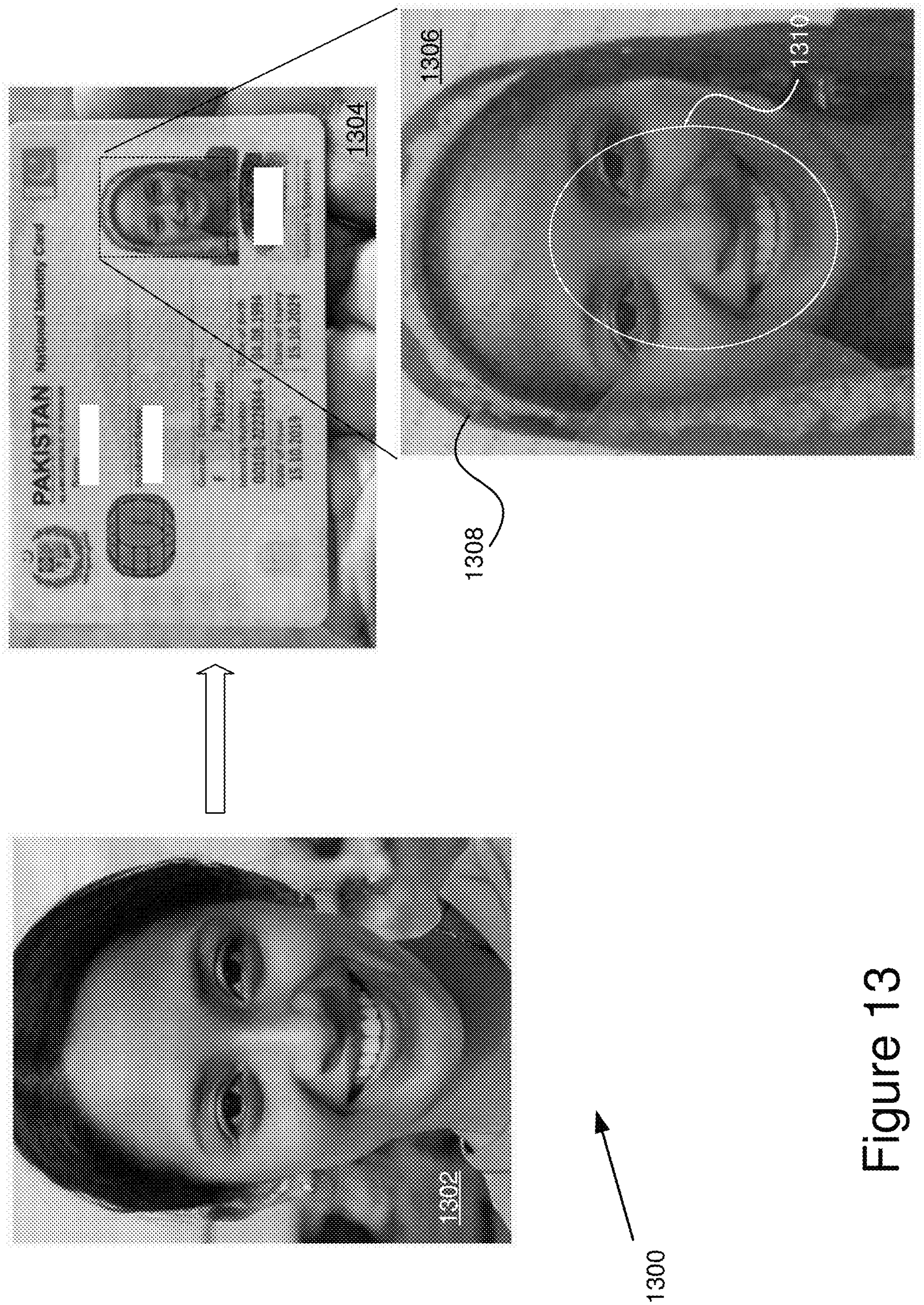
FIG. 13 is an illustration of an example set of images in which the facial image (selfie) is AI generated and the AI generated face is reproduced as the document holder image in the document, which may be detected in accordance with some implementations.

FIG. 13 shows an example of a process 1300 used to generate a deepfake. One image 1302 is an artificial intelligence (AI) generated facial image (selfie). As has been noted above, this type of deepfake image can be easily generated using a variety of software tools that have now become widely available. The fraudster copies a portion (the face of the selfie) of the image 1302 onto an image of an ID card (not shown) to generate image 1304. For example, the fraudster can simply copy or photoshop a portion of the AI generated facial image 1302 onto an image of the ID card to produce image 1304. This image 1304 can be detected by the anti-injection attack system 326 described above as a fraudulent document and reject it. Image 1306 is a blowup of a portion of the image 1304 of the ID card showing the facial image in more detail. In particular, as shown in image 1306, the background portion 1308 of the image 1306 has a microprint security feature across the image as expected. However, the portion 1310 of the image 1306 that the fraudster has copied from 1302 can be seen as not having the microprint security feature on the majority of the face. A valid ID would have the microprint covering the entire face of the person in the holder image, but in this case, the microprint is absence in the center of the holder image face up to the middle of the person's forehead. In some implementations, the subject and scene segmentation analyzer 410 is able to detect the absence of the microprint security feature in the cardholder image 1304. In other implementations, a modeling approach may be used instead of a similarity search. For example, a CNN or anomaly detection model could detect the absence of microprint located in the face region. It should be noted that the subject and scene segmentation analyzer 410 may also detect common portions of the image (e.g., background) that show that the hand and the card position are identical in many attacks. Since the hand and card position never change in multiple fraudster submissions, the subject and scene segmentation analyzer 410 using a partial image search can detect it is repeat fraud.

Figure 14:
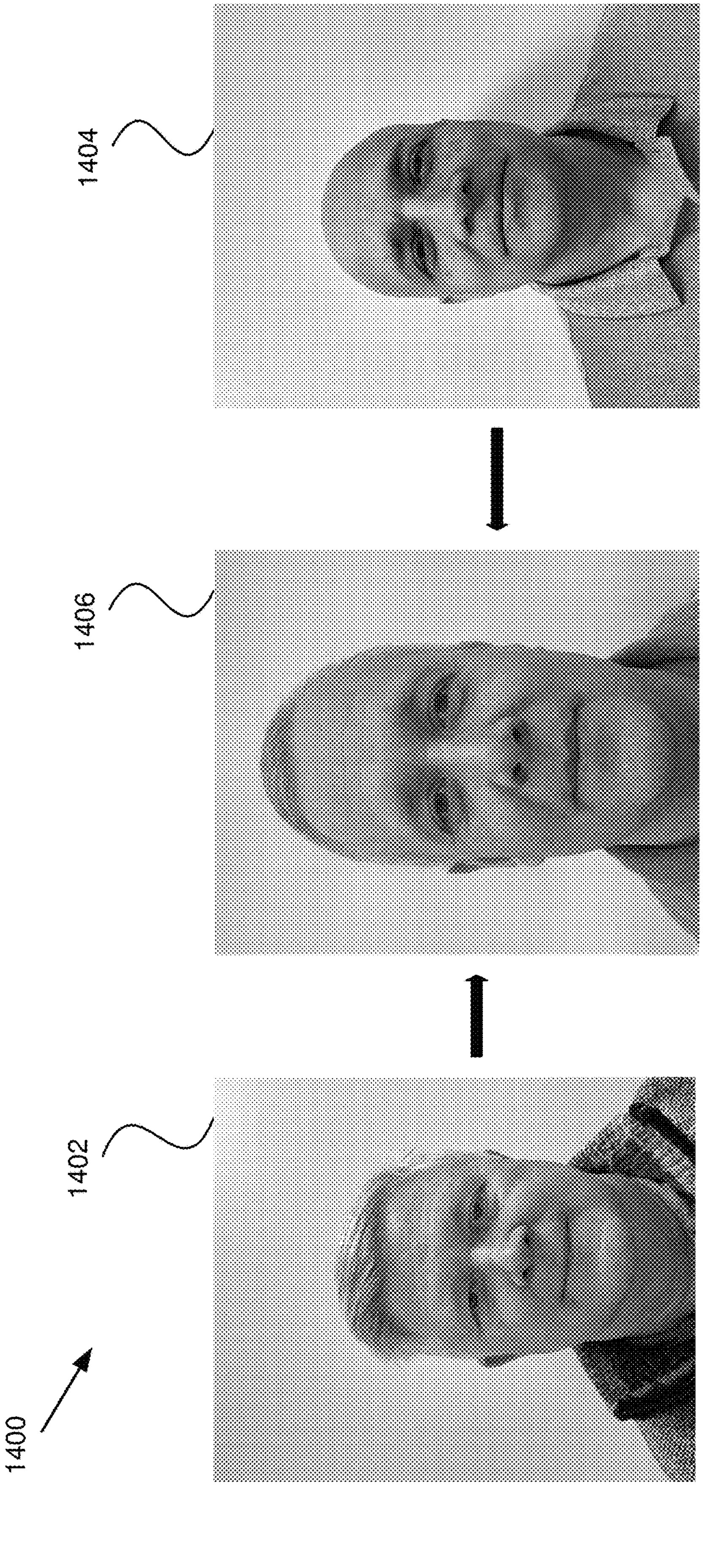
FIG. 14 is an illustration of an example set of images in which two images are face morphed to produce a third image.
Figure 15:
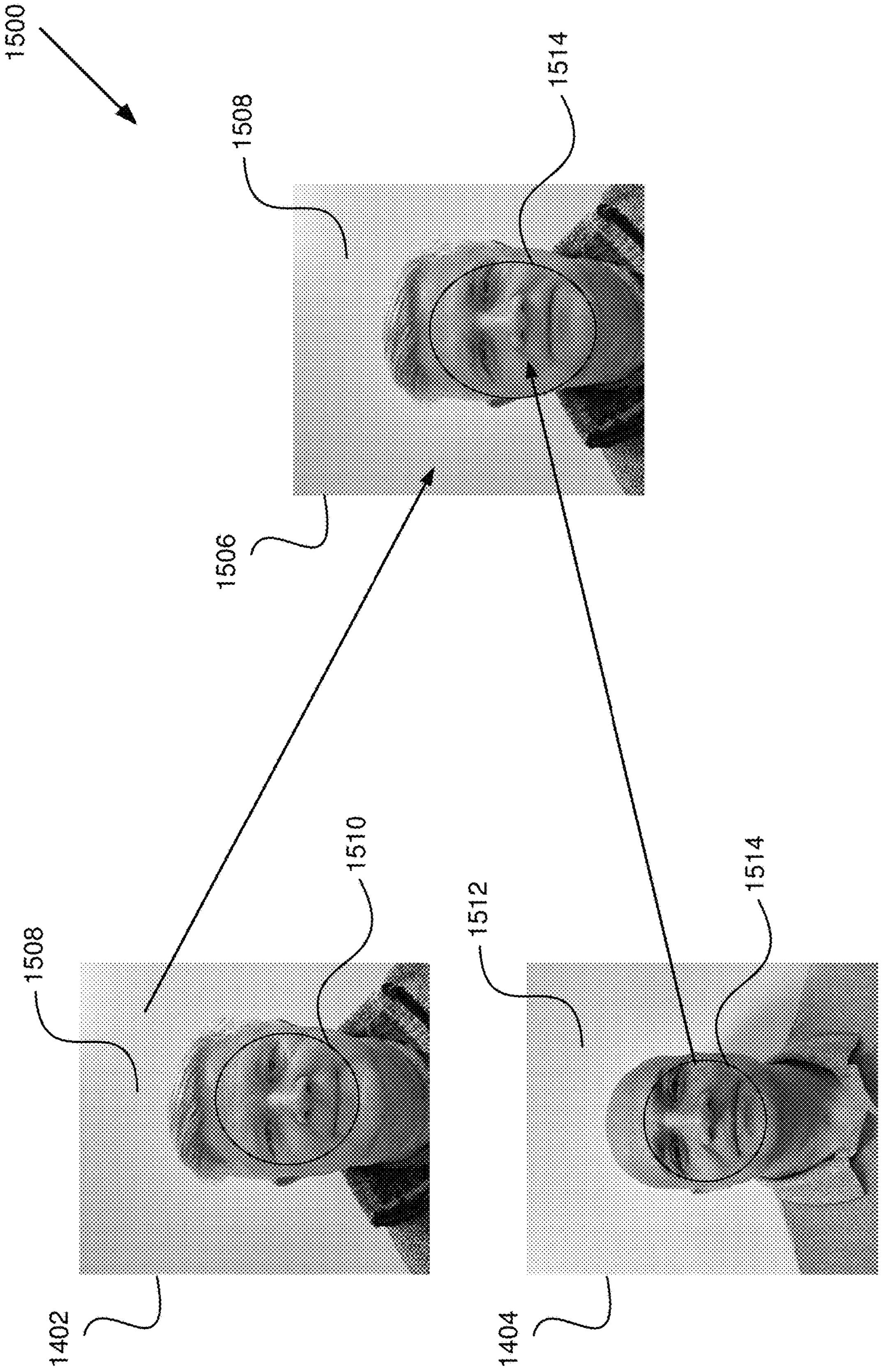
FIG. 15 is an illustration of an example set of images used to perform face swapping.

FIG. 14 shows an example set of images 1402, 1404 and 1406 in which two images 1402 and 1404 are face morphed 1400 to produce a third image 1406. FIG. 14 shows how a nefarious user has morphed an image of the nefarious user (not shown) to make his facial features more similar to those of various, valid document holder's facial image and the resulting deepfake image 1406. Comparing FIG. 14 to FIG. 15 illustrates the difference between a face morph and a face swap is shown. In these two examples, the same base images 1402, 1404 were used to generate the resulting images 1406, 1506. In the case of a face swap (FIG. 15), if you were to mask out everything but the central face oval 1514 of the image, you would immediately recognize it as the face from image 1404. In the case of a face morph (FIG. 14), it is an image 1406 with elements of both of the entire heads of images 1402 and 1404. The edges (for example hair of image 1402) make it hard to see this when you are looking at the entire morphed image 1406. Since the user in image 1404 is follicle-challenged compared to the user in image 1402, the morphing algorithm splits the difference and gives the resulting image 1406 with a much shorter hair cut smoothing the difference between the two entire heads in images 1402 and 1404. You can see the difference when images 1406 and 1506 viewed side by side.

FIG. 15 shows an example set of images 1402, 1404 and 1506 used to perform the process 1500 of face swapping. In this example, the fraudster begins with the first image 1402 and a second image 1404. As shown, the first image 1402 includes a background portion 1508 and a face portion 1510. Similarly, the second image 1404 includes a background portion 1512 and a face portion 1514. The fraudster uses the background portion 1508 of the first image 1402 and combines it with the face portion 1514 of the second image 1404 to generate the third new image 1506. For example, the fraudster could photoshop the face portion 1514 onto image 1402 to generate the new image 1506. This illustrates how simple creating a new image is given the software tools that are readily available.

Figure 16:
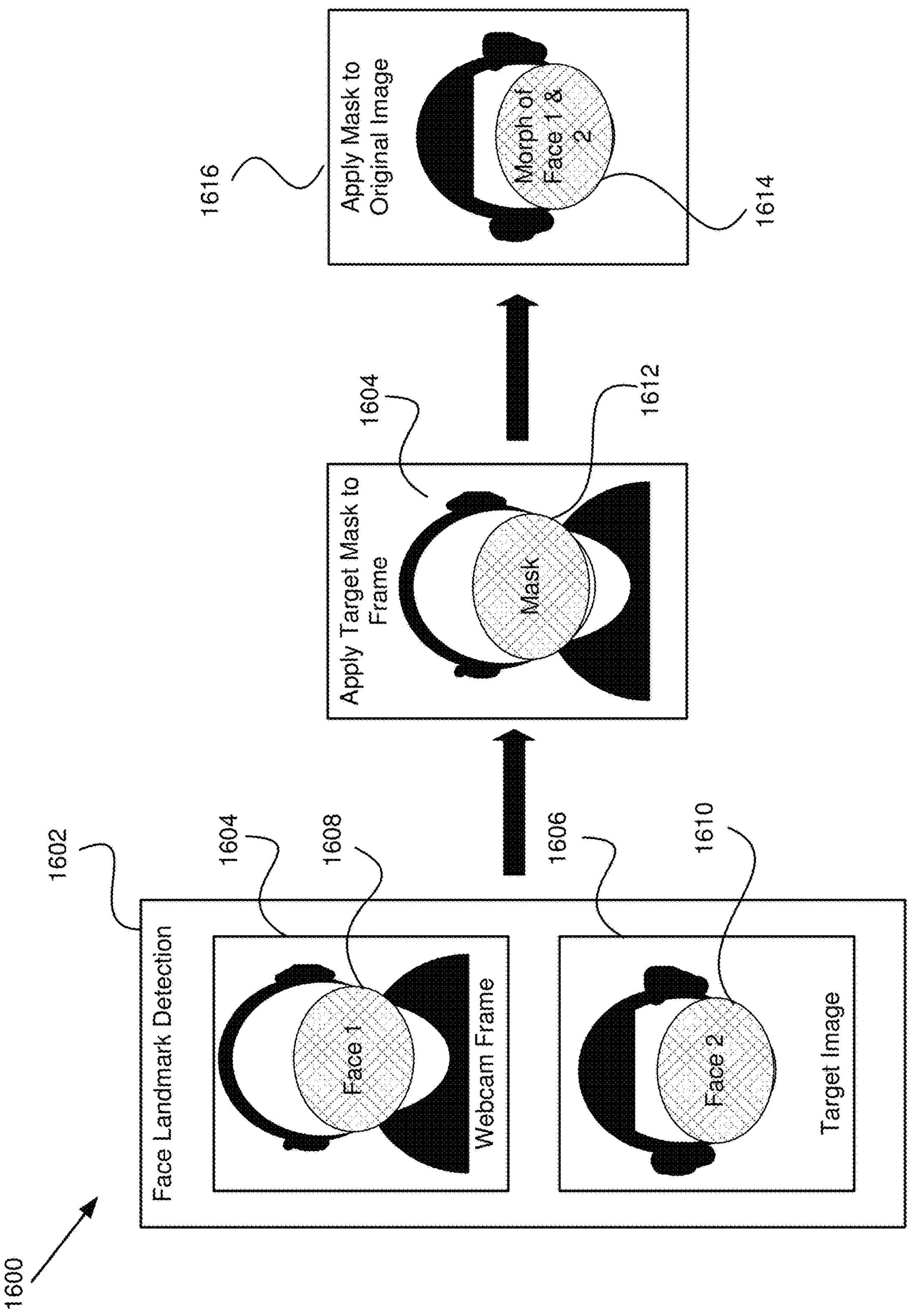
FIG. 16 is a diagram illustrating how face morphing and face swapping can be performed.

FIG. 16 is a diagram illustrating how face morphing and face swapping can be combined into a process 1600 for yet another way to generate a deepfake image. The process begins with face landmark detection 1602 from a first image 1604 and a second image 1606. The first image 1604 includes a face area 1608, face 1. The second image 1606 also includes a face area 1610, face 2. Both these areas are detected for future use. The process 1600 applies a target mask 1612 to the frame, in this case, the Web camera frame with image 1604. Then the process 1600 proceeds to generate a morph 1614 of face 1 1608 and face 2 1610. The process 1600 then applies the mask 1612 to the second image 1606 and replaces the mask 1612 with the morph 1614 generated from phase 1 and phase 2. By understanding how the tools available work to create deepfakes, face morphs, and face swaps, the anti-injection attack system 326 of the present disclosure advantageously can include in its architecture any detection techniques used to determine the new anomalies as they are created by the fraudsters. As an example, this face morph technique changes only the center face area and the forehead, hairline, neck, etc. are left unchanged and can be matched by a similarity match if this is one of a repeat attack using the same scene and subject but with a face change.

Referring now to FIG. 17A, an example set of images 1702, 1704, 1710, and 1720 are used to show how partial image search and image segmentation 1700 is performed. It should be understood that FIG. 17A is merely one example of a way in which an image may be segmented, and there are a variety of other ways or features upon which to segment the image. This is the segmentation that is done prior to the partial image search. The subject and scene segmentation analyzer 410 advantageously allows a subject to be segmented in any number of different ways to determine the portions of the subject that may be repeated and are real and valuable in identifying them. The segmentation also allows identification of areas which should not be identical and repeated in an image. Image 1702 is an example of a beginning image. In this example, the beginning image 1702 is segmented into three different portions: a background, the body, and the face. The second image 1704 shows the segmentation of the background 1706 versus the remainder of the image 1708. The third image 1710 shows the segmentation of the body 1714 portion of the subject versus the remainder of the image 1712. Finally, the fourth image 1720 illustrates the face 1724 portion of the image versus the remainder of the image 1722. It should be understood that the example of FIG. 17A is merely one example of the many possibilities for segmenting subject and scene to improve similarity matches.

Figure 17B:
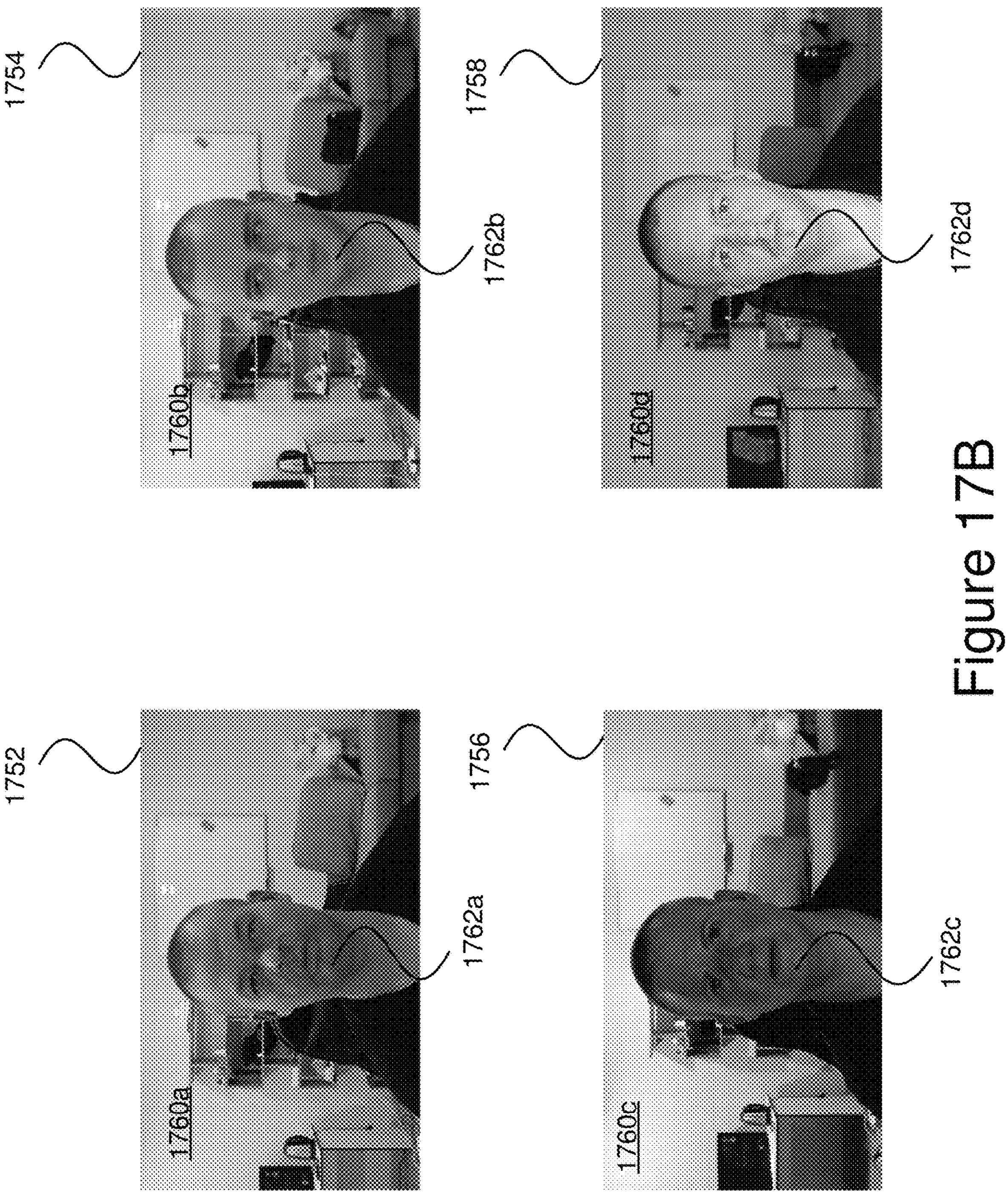
FIG. 17B is an illustration of an example set of images having a similar background that can be detected using partial image search and segmentation.

FIG. 17B shows an example set of images 1752, 1754, 1756, and 1758 having similar backgrounds that can be detected using partial image search and segmentation. The images 1752, 1754, 1756, and 1758 show examples of facial images (e.g., selfies) with similar, or identical backgrounds. This set of images 1752, 1754, 1756, and 1758 shows the strength of the subject and scene segmentation analyzer 410 because even though the backgrounds 1760*a*, 1760*b*, 1760*c*, and 1760*d* change slightly image to image, a similarity match is still found by the subject and scene segmentation analyzer 410. In each of the images 1752, 1754, 1756, and 1758, the faces 1762*a*, 1762*b*, 1762*c*, and 1762*d* are very different as the fraudster has swapped in different faces into versions of the base image. In other implementations, the fraudster may perform injection on the same selfie or may generate a series of injected selfies (i.e., selfies generated using injection serially during a single session so that the nefarious user's background, clothes, etc. are similar, but may not be identical). The subject and scene segmentation analyzer 410 advantageously identifies repeated fraudulent attempts that use similar, but not identical images, which have historically presented a challenge for prior art detection systems. For example, existing methods using hashes may determine identicality, but not similarity that does not rise to the level of identicality. It should be noted that since the face is the only significant change in the images, the head shape and hair line and outline of the head or other portions are identical so they can also be segmented out, measured and a representation generated; and the representation used in a similarity match as another fraud signal in addition to background similarity or other portions of similarity.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer-readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:

receiving first image data associated with a user;

performing a first detection type comprising a multi-frame deepfake detection model on the first image data to generate a first signal;

performing a second detection type comprising a single frame deepfake detection model on the first image data to generate a second signal;

performing a third detection type comprising a subject and scene segmentation analysis on the first image data, wherein performing the third detection type further comprises generating a vector embedding for the first image data, accessing a matrix of vector embeddings, searching for cosine similarities between embeddings in the matrix and the vector embedding generated, and generating a third signal based on the searching for the cosine similarities;

generating an aggregated fraud score based upon the first signal, the second signal and the third signal; and accepting the first image data as genuine upon comparing the aggregated fraud score to a threshold to determine if the aggregated fraud score satisfies the threshold.

2. The computer-implemented method of claim 1 further comprising: rejecting the first image data as fraudulent based upon the aggregated fraud score.

3. The computer-implemented method of claim 1 wherein the first detection type is one from a group of: a deepfake model, a face morph model, a face swap model, an unknown injection attack anomaly model, a subject and scene segmentation analyzer, an injection checker, a device risk checker, a liveness detector, a face match and face analysis subsystem, an injection attack detector and a device risk detector.

4. The computer-implemented method of claim 1 wherein the second detection type is one from a group of: a deepfake model, a face morph model, a face swap model, an unknown injection attack anomaly model, a subject and scene segmentation analyzer, an injection checker, a device risk checker, a liveness detector, a face match and face analysis subsystem, an injection attack detector and a device risk detector.

5. The computer-implemented method of claim 1 wherein the first image data includes a selfie image and a document image, and the method further comprises performing a fourth detection type using the selfie image and the document image to generate a fourth signal, wherein the fourth detection type is a face match and face analysis that compares the selfie image to a holder portion of the document image and generates the fourth signal based on a match between the selfie image and the holder portion of the document image and wherein the aggregated fraud score is generated based upon the first signal, the second signal, the third signal, and the fourth signal.

6. The computer-implemented method of claim 1 wherein the first image data includes a selfie image and a document image, and the method further comprises performing the third detection type using the selfie image and the document image to generate the third signal, wherein the third detection type is a face match and face analysis that compares the selfie image to a holder portion of the document image and generates the third signal based on a match between the selfie image and the holder portion of the document image, and wherein the first image data is rejected as genuine based upon only the third signal.

7. The computer-implemented method of claim 1 wherein the first image data is one from a group of a selfie and a video.

8. The computer-implemented method of claim 1 wherein the first image data includes a selfie image, and the method further comprises:

receiving a document image;

performing the first detection type on the document image to generate the third signal;

performing the second detection type on the document image to generate a fourth signal; and wherein the generating the aggregated fraud score is also based on the third signal and the fourth signal.

9. The computer-implemented method of claim 1 wherein the first image data includes a selfie image, and the method further comprises:

receiving a document image;

extracting selfie metadata from the selfie image;

extracting document metadata from the document image; and wherein the generating the aggregated fraud score is also based on the selfie metadata and the document metadata.

10. The computer-implemented method of claim 1 wherein the first image data includes a selfie image and a document image, and the method further comprises performing the third detection type using the selfie image and the document image to generate the third signal, wherein the third detection type is a face match and face analysis that compares the selfie image to a holder portion of the document image and generates the third signal based on a match between the selfie image and the holder portion of the document image.

11. The computer-implemented method of claim 1 wherein satisfying the threshold indicates that the first image data is acceptable and not satisfying the threshold indicates that the first image data is fraudulent.

12. The computer-implemented method of claim 1, further comprising:

performing the third detection type on the first image data to generate the third signal; and wherein the first image data is rejected as genuine based upon only the third signal.

13. A system comprising:

one or more processors; and a memory operably coupled with the one or more processors, wherein the memory stores instructions that, in response to execution of the instructions by the one or more processors, cause the one or more processors to:

receive a first image data associated with a user;

perform a first detection type comprising a multi-frame deepfake detection model on the first image data to generate a first signal;

perform a second detection type comprising a single frame deepfake detection model on the first image data to generate a second signal;

perform a third detection type comprising a subject and scene segmentation analysis on the first image data, wherein performing the third detection type further comprises generating a vector embedding for the first image data, accessing a matrix of vector embeddings, searching for cosine similarities between embeddings in the matrix and the vector embedding generated, and generating a third signal based on the searching for the cosine similarities;

generate an aggregated fraud score based upon the first signal and the second signal and the third signal; and accept the first image data as genuine based upon comparing the aggregated fraud score to a threshold to determine if the aggregated fraud score satisfies the threshold.

14. The system of claim 13, wherein the instructions cause the one or more processors to reject the first image data as fraudulent based upon the aggregated fraud score.

15. The system of claim 13, wherein the first detection type is one from a group of: a deepfake model, face morph model, a face swap model, an unknown injection attack anomaly model, a subject and scene segmentation analyzer, an injection checker, a device risk checker, a liveness detector, a face match and face analysis subsystem, an injection attack detector, and a device risk detector.

16. The system of claim 13, wherein the second detection type is one from a group of: a deepfake model, face morph model, a face swap model, an unknown injection attack anomaly model, a subject and scene segmentation analyzer, an injection checker, a device risk checker, a liveness detector, a face match and face analysis subsystem, an injection attack detector and a device risk detector.

17. The system of claim 13, wherein the first image data includes a selfie image and a document image, and the system is further configured to performing a fourth detection type using the selfie image and the document image to generate a fourth signal, wherein the fourth detection type is a face match and face analysis that compares the selfie image to a holder portion of the document image and generates the fourth signal based on a match between the selfie image and the holder portion of the document image, and wherein the aggregated fraud score is generated based upon the first signal, the second signal, the third signal, and the fourth signal.

18. The system of claim 13 14, wherein the first image data includes a selfie image and a document image, and the system is further configured to performing the third detection type using the selfie image and the document image to generate the third signal, wherein the third detection type is a face match and face analysis that compares the selfie image to a holder portion of the document image and generates the third signal based on a match between the selfie image and the holder portion of the document image, and wherein the first image data is rejected as genuine based upon only the third signal.

19. The system of claim 13, wherein the first image data is one from a group of a selfie and a video.

20. The system of claim 13, wherein the first image data includes a selfie image, and the instructions cause the one or more processors to:

receive a document image;

perform the first detection type on the document image to generate the third signal;

perform the second detection type on the document image to generate a fourth signal; and wherein the aggregated fraud score is also based on the third signal and the fourth signal.

21. The system of claim 13, wherein the first image data includes a selfie image, and the instructions cause the one or more processors to:

receive a document image;

extract selfie metadata from the selfie image; and extract document metadata from the document image, and wherein the aggregated fraud score is also based on the selfie metadata and the document metadata.

22. The system of claim 13 wherein the first image data includes a selfie image and a document image, and wherein the instructions cause the one or more processors to perform the third detection type using the selfie image and the document image to generate the third signal, wherein the third detection type is a face match and face analysis that compares the selfie image to a holder portion of the document image and generates the third signal based on a match between the selfie image and the holder portion of the document image.

23. The system of claim 13 wherein satisfying the threshold indicates that the first image data is acceptable and not satisfying the threshold indicates that the image data is fraudulent.

24. The system of claim 13, wherein the instructions cause the one or more processors to:

perform the third detection type on the first image data to generate the third signal; and wherein the first image data is rejected as genuine based upon only the third signal.

* * * * *